(12) United States Patent
Goto et al.

(10) Patent No.: US 10,124,295 B2
(45) Date of Patent: Nov. 13, 2018

(54) SEAWATER DESALINATION SYSTEM AND ENERGY RECOVERY APPARATUS

(71) Applicant: EBARA CORPORATION, Tokyo (JP)

(72) Inventors: Akira Goto, Tokyo (JP); Tamami Takahashi, Tokyo (JP); Motohiko Nohmi, Tokyo (JP); Masanori Goto, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 0 days.

(21) Appl. No.: 15/977,109

(22) Filed: May 11, 2018

(65) Prior Publication Data

US 2018/0257035 A1  Sep. 13, 2018

Related U.S. Application Data

(62) Division of application No. 15/504,230, filed as application No. PCT/JP2015/074421 on Aug. 28, 2015, now Pat. No. 10,005,034.

(30) Foreign Application Priority Data

Sep. 1, 2014  (JP) .................................. 2014-177469

(51) Int. Cl.
*B01D 61/06* (2006.01)
*B01D 61/02* (2006.01)
(Continued)

(52) U.S. Cl.
CPC ............. *B01D 61/06* (2013.01); *B01D 61/02* (2013.01); *B01D 61/025* (2013.01); *B01D 61/58* (2013.01);
(Continued)

(58) Field of Classification Search
CPC ...... B01D 61/02; B01D 61/025; B01D 61/06; B01D 61/08; B01D 61/58; B01D 63/12;
(Continued)

(56) References Cited

U.S. PATENT DOCUMENTS 5,298,226 A    3/1994  Nowobilski
2013/0233785 A1  9/2013  Takahashi et al.
(Continued)

FOREIGN PATENT DOCUMENTS

JP    S53-124178 A   10/1978
JP    2010-284642 A  12/2010
(Continued)

OTHER PUBLICATIONS

International Search Report issued in Patent Application No. PCT/JP2015/074421 dated Nov. 17, 2015.
(Continued)

*Primary Examiner* — John Kim
(74) *Attorney, Agent, or Firm* — Pearne & Gordon LLP

(57) ABSTRACT

The present invention relates to a seawater desalination system for desalinating seawater by removing salinity from the seawater and an energy recovery apparatus which is preferably used in the seawater desalination system. The energy recovery apparatus includes a cylindrical chamber (CH) being installed such that a longitudinal direction of the chamber is placed in a vertical direction, a concentrated seawater port (P1) for supplying and discharging the concentrated seawater, a seawater port (P2) for supplying and discharging the seawater, a flow resistor (23) provided at a concentrated seawater port (P1) side in the chamber (CH), and a flow resistor (23) provided at a seawater port (P2) side in the chamber (CH). Each of the flow resistor (23) provided at the concentrated seawater port (P1) side and the seawater port (P2) side comprises at least one perforated circular plate, and each perforated circular plate has a plurality of holes formed in an outer circumferential area outside a circle having a predetermined diameter on the perforated circular plate.

6 Claims, 27 Drawing Sheets

(51) Int. Cl.
*C02F 1/44* (2006.01)
*B01D 61/58* (2006.01)
*B01D 63/12* (2006.01)
C02F 103/08 (2006.01)
B01D 61/08 (2006.01)

(52) U.S. Cl.
CPC ............... *B01D 63/12* (2013.01); *C02F 1/44* (2013.01); *C02F 1/441* (2013.01); B01D 61/08 (2013.01); C02F 2103/08 (2013.01); C02F 2303/10 (2013.01); Y02A 20/131 (2018.01)

(58) Field of Classification Search
CPC ........ C02F 1/44; C02F 1/441; C02F 2103/08; C02F 2303/10; Y02A 20/131
See application file for complete search history.

(56) References Cited

U.S. PATENT DOCUMENTS

2016/0030887 A1 2/2016 Takahashi et al.
2016/0051933 A1 2/2016 Takahashi et al.

FOREIGN PATENT DOCUMENTS

| JP | 2013-078012 A | 4/2013 |
| JP | 2013-184096 A | 9/2013 |
| WO | 2014-163018 A1 | 10/2014 |
| WO | 2014-163019 A1 | 10/2014 |
| WO | 2015-060337 A1 | 4/2015 |

OTHER PUBLICATIONS

Written Opinion issued in Patent Application No. PCT/JP2015/074421 dated Nov. 17, 2015.

SEAWATER DESALINATION SYSTEM AND ENERGY RECOVERY APPARATUS

This is a division of U.S. patent application Ser. No. 15/504,230 filed Feb. 15, 2017, which is the national phase of PCT/JP2015/074421 filed Aug. 28, 2015, which claims the benefit of Japanese Patent Application No. 2014-177469 filed Sep. 1, 2014, each which is incorporated herein by reference in its entirety.

TECHNICAL FIELD

The present invention relates to a seawater desalination system for desalinating seawater by removing salinity from the seawater and an energy recovery apparatus which is preferably used in the seawater desalination system.

BACKGROUND ART

Conventionally, as a system for desalinating seawater, there has been known a seawater desalination system in which seawater passes through a reverse-osmosis membrane-separation apparatus to remove salinity from the seawater. In the seawater desalination system, the intake seawater is processed to have certain water qualities by a pretreatment system, and the pretreated seawater is delivered into the reverse-osmosis membrane-separation apparatus under pressure by a high-pressure pump. Part of the high-pressure seawater in the reverse-osmosis membrane-separation apparatus passes through a reverse-osmosis membrane against the osmotic pressure and is desalinated, and fresh water (permeate or desalted water) is taken out from the reverse-osmosis membrane-separation apparatus. The remaining seawater is discharged in a concentrated state of a high salt content as a concentrated seawater (brine) from the reverse-osmosis membrane-separation apparatus. The largest operational cost in the seawater desalination system is energy cost, and it depends heavily on energy for pressurizing the pretreated seawater up to such a pressure to overcome the osmotic pressure, i.e. up to the reverse-osmosis pressure. That is, the operational cost of the seawater desalination system is greatly affected by pressurizing energy of the seawater by the high-pressure pump.

Specifically, more than half of the electric expenses as the highest cost in the seawater desalination system are consumed to operate the high-pressure pump for pressurizing the seawater. Therefore, pressure energy possessed by the high-pressure concentrated seawater (reject) with the high salt content which has been discharged from the reverse-osmosis membrane-separation apparatus is utilized for pressurizing part of the seawater. Therefore, as a means for utilizing the pressure energy of the concentrated seawater discharged from the reverse-osmosis membrane-separation apparatus to pressurize part of the seawater, there has been utilized an energy recovery chamber in which an interior of a cylinder is separated into two spaces by a piston arranged to be movable in the cylinder, a concentrated seawater port is provided in one of the two separated spaces to introduce and discharge the concentrated seawater, and a seawater port is provided in the other of the two separated spaces to introduce and discharge the seawater.

FIG. 21 is a schematic view showing a configuration example of a conventional seawater desalination system. As shown in FIG. 21, seawater pumped into the seawater desalination system by an intake pump (not shown) is processed to have certain water qualities by a pretreatment system for removing suspended matter or the like, and then the pretreated seawater is delivered via a seawater supply line 1 into a high-pressure pump 2 that is driven by a motor M. The seawater which has been pressurized by the high-pressure pump 2 is supplied via a discharge line 3 to a reverse-osmosis membrane-separation apparatus 4 having a reverse-osmosis membrane (RO membrane). The reverse-osmosis membrane-separation apparatus 4 separates the seawater into concentrated seawater with a high salt content and fresh water with a low salt content and obtains the fresh water from the seawater. At this time, the concentrated seawater with a high salt content is discharged from the reverse-osmosis membrane-separation apparatus 4, and the discharged concentrated seawater still has a high-pressure. A concentrated seawater line 5 for discharging the concentrated seawater from the reverse-osmosis membrane-separation apparatus 4 is connected via a control valve 6 to a concentrated seawater port P1 of an energy recovery chamber 10. A seawater supply line 1 for supplying the pretreated seawater having a low pressure is branched at an upstream side of the high-pressure pump 2 and is connected via a valve 7 to a seawater port P2 of the energy recovery chamber 10. The energy recovery chamber 10 has a piston 16 therein, and the piston 16 is arranged to be movable in the energy recovery chamber 10 while separating the interior of the energy recovery chamber 10 into two volume chambers.

The seawater pressurized by utilizing a pressure of the concentrated seawater in the energy recovery chamber 10 is supplied via the valve 7 to a booster pump 8. The control valve 6, the valve 7 and the energy recovery chamber 10 constitute an energy recovery apparatus 11. Then, the seawater is further pressurized by the booster pump 8 so that the seawater has the same pressure level as the discharge line 3 of the high-pressure pump 2, and the pressurized seawater merges via a valve 9 into the discharge line 3 of the high-pressure pump 2 and is then supplied to the reverse-osmosis membrane-separation apparatus 4.

FIG. 22 is a schematic view showing a configuration example of the conventional seawater desalination system comprising the two control valves 6, the two energy recovery chambers 10 and the two valves 7 which are the components of the energy recovery apparatus shown in FIG. 21. As shown in FIG. 22, since the energy recovery apparatus 11 has the two energy recovery chambers 10, 10, the energy recovery apparatus 11 is operated such that while the concentrated seawater is supplied to one of the two energy recovery chambers 10, 10, the concentrated seawater is discharged from the other of the energy recovery chambers. Therefore, since the high-pressure seawater can be discharged at all times (continuously) from the apparatus by alternating suction of the low-pressure seawater and discharge of the high-pressure seawater, the flow rate of the seawater supplied to the reverse-osmosis membrane separation apparatus 4 can be kept constant and the fresh water can be obtained at a constant flow rate from the reverse-osmosis membrane separation apparatus 4.

In the above-described conventional energy recovery chamber, the piston in the energy recovery chamber is brought into sliding contact with the inner wall of the chamber, and thus the sliding member of the piston is required to be periodically replaced due to wear of the sliding member. Further, the inner diameter of the long chamber is required to be machined with high accuracy so as to fit with the outer shape of the piston, and thus machining cost is very expensive.

Therefore, the applicants of the present invention have proposed an energy recovery chamber having no piston in Japanese laid-open patent publication No. 2010-284642 by employing the system for pressurizing the seawater directly with the concentrated seawater by introducing the seawater and the high-pressure concentrated seawater discharged from the reverse-osmosis membrane (RO membrane) into a cylindrical and elongated chamber, which is used as an energy exchange chamber.

FIG. 23 is a cross-sectional view showing an energy recovery chamber 10 having no piston. As shown in FIG. 23, the energy recovery chamber 10 comprises a long chamber body 11 having a cylindrical shape, and end plates 12 for closing both opening ends of the chamber body 11. A chamber CH is formed in the chamber body 11, and a concentrated seawater port P1 is formed in one of the end plates 12 and a seawater port P2 is formed in the other of the end plates 12. The concentrated seawater port P1 and the seawater port P2 are disposed on the central axis of the cylindrical chamber body 11. The inner diameter of the chamber CH is set to $\phi D$, and the inner diameter of the concentrated seawater port P1 and the seawater port P2 is set to $\phi d$.

The energy recovery chamber 10 is installed vertically. The chamber CH is disposed vertically in consideration of the effect of a difference in specific gravity between the concentrate seawater and the seawater, and the port P1 for the concentrated seawater having large specific gravity is disposed at a lower part of the chamber CH and the port P2 for the seawater having small specific gravity is disposed at an upper part of the chamber CH. Specifically, the long chamber body 11 having a cylindrical shape is disposed such that a longitudinal direction (axial direction) of the chamber is placed in a vertical direction. The concentrated seawater port P1 is provided at the lower part of the chamber CH so as to supply and discharge the concentrated seawater at the lower part of the chamber CH, and the seawater port P2 is provided at the upper part of the chamber CH so as to supply and discharge the seawater at the upper part of the chamber CH. The entire length of the chamber CH is L. In the chamber CH, a flow resistor 13 is disposed at a position spaced by a distance L1 in the axial direction from the concentrated seawater port P1, and a flow resistor 13 is disposed at a position spaced by a distance L1 in the axial direction from the seawater port P2. The flow resistor 13 comprises a single perforated plate.

In the energy recovery chamber 10 shown in FIG. 23, a fluid flows in from the respective ports P1, P2 having a small diameter, and the fluid flow having a large velocity distribution at a central part of the chamber is dispersed in a diametrical direction of the chamber CH by the flow resistor 13 and is thus regulated to form a uniform flow in the cross-section of the chamber. Therefore, two fluids are pushed and pulled in such a state that the interface between the seawater and the concentrated seawater is maintained horizontally, and thus the energy transmission is performed while maintaining the state in which the seawater and the concentrated seawater having different salt concentrations are less likely to be mixed in the chamber.

FIG. 24 is a cross-sectional view showing the energy recovery chamber 10 in which two perforated plates spaced by a predetermined distance are disposed near the respective ports as a flow resistor disposed near each port in FIG. 23. As shown in FIG. 24, in the chamber CH, a first perforated plate 14 is provided at a position spaced by a distance L1 in the axial direction from the concentrated seawater port P1, and a second perforated plate 15 is provided at a position spaced by a distance L2 in the axial direction from the first perforated plate 14. Similarly, a first perforated plate 14 is provided at a position spaced by a distance L1 in the axial direction from the seawater port P2, and a second perforated plate 15 is provided at a position spaced by a distance L2 in the axial direction from the first perforated plate 14. The two perforated plates 14 and 15 constitute a flow resistor 13.

Other structural elements of the energy recovery chamber 10 shown in FIG. 24 are the same as those in the energy recovery chamber 10 shown in FIG. 23.

The applicant of the present invention has found that in the above energy recovery apparatus, when the fluid which flows into the chamber has a high flow velocity, or depending on dimension and shape of the perforated plate or the arrangement position of the perforated plate, i.e., the distance L1 in FIG. 23 or the distances L1, L2 in FIG. 24, the effect of dispersion and regulation of the fluid is not sufficient and non-uniform flow having a high flow velocity still at the central part of the chamber is formed. Thus, the applicant of the present invention has proposed its solution in Japanese patent application No. 2013-078012 (has not been disclosed). Specifically, as shown in FIG. 25, in the chamber CH, a flow resistor 23 is disposed at a position spaced by a distance L1 in the axial direction from the concentrated seawater port P1, and a flow resistor 23 is disposed at a position spaced by a distance L1 in the axial direction from the seawater port P2. As shown in FIG. 26 which is a plan view of the flow resistor, the flow resistor 23 comprises a single perforated plate which has a circular plate shape having an outer diameter ($\phi D$) equal to the inner diameter of the chamber and has a plurality of small holes 23h having a diameter $\phi dk1$ formed outside a hypothetical circle ($\phi dc$) at a central part of the circular plate and no hole inside the hypothetical circle (center side). Specifically, the perforated plate which has a blocked central portion is disposed.

FIG. 27 is a view showing the flow distribution by Computational Fluid Dynamics in the vicinity of the seawater port in the case where the flow resistor 23 comprising a perforated plate whose central portion is blocked is installed horizontally as shown in FIG. 25. Arrows in FIG. 27 are as follows: Flow velocity of fluid is shown by a length of arrow and flow direction of fluid is shown by a direction of arrow.

Because the fluid flows into the chamber CH from the seawater port P2 having a small diameter, the fluid near the port of the chamber has a velocity distribution having a large stream at the central part of the chamber. The high-velocity flow of fluid at the central part collides with the blockage portion of the perforated plate facing the port, and then the flow of fluid is directed horizontally along the plate toward the outer circumference of the chamber, the fluid passes through the perforated plate only from the small holes formed at the outer circumferential portion of the perforated plate and flows downstream, and part of the horizontal flow of fluid is directed upwardly along the side surface of the chamber, thus generating large vortices at the outer circumferential portion of the chamber. At this time, the flow of fluid collides with the blockage portion of the perforated plate and is then directed toward the outer circumference of the chamber, and the high-velocity fluid which flows into the chamber from the port is slowed down. The flow of fluid which has passed through the small holes at the outer circumferential portion of the perforated plate is directed towards the outer circumferential side once at its central pan, and then gathers in the central part of the chamber again. Although the vortices generate at the downstream side of the blockage portion of the perforated plate, the velocity of flow and the direction of flow can be uniformized in the A-A cross-section spaced by a predetermined distance from the perforated plate shown in FIG. 27 to the center of the chamber.

CITATION LIST

Patent Literature

Patent document 1: Japanese laid-open patent publication No. 2010-284642

SUMMARY OF INVENTION

Technical Problem

The applicant of the present invention has made an analysis of the characteristics of flows in the chamber by utilizing Computational Fluid Dynamics (CFD) focusing on a velocity distribution of fluid which flows in from the port of the energy recovery apparatus shown in FIGS. 25 and 26. As a result, the applicant of the present invention has found that the perforated plate having the circular blockage portion at the central part of the circular plate has velocity dependency, and the velocities and directions of the flows in the chamber become uniform by the perforated plate in a limited range of inflow velocity, and that when the flow velocity of the fluid which flows in from the port having a small diameter varies, the velocity distribution at an evaluation section that is spaced by a predetermined distance from the perforated plate toward the center of the chamber also varies, thus lowering the flow uniformity.

FIG. 28 is a view showing the flow distribution by Computational Fluid Dynamics (CFD) in the vicinity of the seawater port, where a perforated plate having a circular blockage portion at a central part of a circular plate is disposed in the chamber and the flow velocity of fluid is set to be three times greater than the case of FIG. 27.

As a result of the Computational Fluid Dynamics (CFD) and analysis, it has been found that the variation in the velocity distribution depending on the flow velocity of fluid is caused by the size of a vortex generated at the back side (downstream side) of the circular blockage portion at the central part of the circular plate.

A comparison between FIG. 27 and FIG. 28 shows that the directions of flows G passing through the vicinity of the outer edge of the central blockage portion are more inclined toward the outer peripheral side of the chamber in FIG. 28 than those in FIG. 27, the flow velocity of fluid being higher in FIG. 28 than in FIG. 27. The vortex (denoted by Vx in FIG. 28) generated at the back side of the central blockage portion spreads in a laterally longer pattern. Thus, it is analyzed that the action by which the flows directed once from the center toward the outer peripheral side are strongly attracted to the center is produced in the downstream side of the vortex, resulting in a lowering of the flow uniformity at the evaluation section that is spaced by a predetermined distance from the perforated plate when the flow velocity of fluid from the port becomes high.

As described above, the perforated plate or mesh having the circular blockage portion at its central part has the action to disperse the flow in the chamber uniformly at all times if the flow velocity of fluid front the port having a small diameter falls within a predetermined range. However, the desired action may not be obtained if the flow velocity of fluid from the port is greatly changed. In particular, when the fluid is supplied to and discharged from the chamber from an actual port, the fluid does not flow at a constant velocity from the port into the chamber at all times, but the flow velocity greatly varies in one cycle. Specifically, the increase in the flow velocity limit for obtaining a desired flow uniformizing action allows the energy recovery chamber to be applicable to a wide range of flow rate to be processed. The flow velocity limit for the perforated plate having the circular blockage portion at its central part has been about 250 mm/s. However, even if a flow velocity exceeds this flow velocity limit, the flow uniformizing action does not completely disappear, but the flow velocity distribution becomes greater than a predetermined threshold value.

Here, a uniform flow of fluid means that speed and directions of fluid flow are uniform in a certain horizontal cross-section of the chamber. Specifically, the case where flow speed of fluid (scalar) and flow direction of fluid (vector) in a certain horizontal cross-section of the chamber are identically distributed at any position in the horizontal cross-section is defined as a completely uniform flow of fluid. Specifically, as shown in FIG. 29, flows at arbitrary points Pn, Pm in the horizontal cross-section are shown by arrows representing flow magnitudes which are Vn, Vm, respectively. In this case, when angles ($\alpha$, $\beta$) between the arrows and the auxiliary lines X, Y (X is perpendicular to Y) on the horizontal cross-section are the same ($\alpha_n = \alpha_m$, $\beta_n = \beta_m$), the flows at the points Pn, Pm are defined as a uniform flow. When the angles $\alpha$, $\beta$ are the same at any position in the horizontal cross-section, such flow is defined as a completely uniform flow of fluid. Here, the condition of being closer to this state is defined as a uniform flow. Because a cylindrical chamber wall exists at the outer circumference in the horizontal cross-section as a vertical wall surface, as both the angles $\alpha$, $\beta$ become closer to a right angle, more uniform flow is formed.

When the fluid flows into the chamber CH from the respective ports P1, P2 having a small diameter, the fluid flows through the central part at a high velocity and through the outer circumferential part at a low velocity in the horizontal cross-section of the chamber in the vicinity of the respective ports P1, P2. Here, to make the dispersion of velocity distribution in the horizontal cross-section small by averaging the fluid flow so that the fluid flows through the central part at a low velocity and through the outer circumferential part at a high velocity is defined as "an uniformizing action" "for uniformizing the flow". Further, "regulating the flow" means that distribution of flow velocity is changed, and to form a uniform flow as a result of changing the distribution of flow velocity by regulating the flow is defined as "uniformization of flow by regulating the flow".

The pushing and pulling of the seawater and the concentrated seawater means the operation for pushing out (pushing) the seawater from the chamber while pressurizing the seawater with the concentrated seawater, and then drawing in and discharging (pulling) the concentrated seawater with the seawater by switching the valve 6. In FIGS. 24 and 25, a boundary portion of the two fluid where the seawater and the concentrated seawater are brought into contact with each other is formed in the chamber space having a length La between the flow resistors 13, 13. The boundary portion reciprocates in La by pushing and pulling of the seawater and the concentrated seawater, and thus the seawater and the concentrated seawater are controlled so that the seawater is not discharged from the concentrated seawater port P1 and the concentrated seawater is not discharged from the seawater port P2. In the case where the chamber is installed vertically, i.e., is configured such that the concentrated seawater is located at the lower part of the chamber and the seawater is located at the upper part of the chamber, the pushing and pulling of the seawater and the concentrated seawater have the same meaning as the pushing up the seawater and pushing down the concentrated seawater.

The mixing of the seawater and the concentrated seawater at the boundary portion is accelerated by pushing and pulling of the seawater and the concentrated seawater. However, by allowing the flow of the seawater and the concentrated seawater above and below the boundary portion to be a uniform flow in the zone of La in the chamber, the phenomenon in which the boundary surface causes turbulence flow diffusion by non-uniformity of the flow to mix the seawater and the concentrated seawater is suppressed. At the same time, by maintaining the boundary portion horizontally, the pushing and pulling of the seawater and the concentrated seawater can be performed as if there is a hypothetical piston.

When pushing and pulling of the seawater and the concentrated seawater are performed in a state of non-uniform flow in the cross-section of the chamber, mixing of the seawater and the concentrated seawater caused by turbulent flow diffusion in the chamber progresses, and thus the seawater having a high salt content is discharged from the energy recovery apparatus. As a result, the salt content of the seawater supplied to the reverse-osmosis membrane-separation apparatus increases, thus decreasing the amount of fresh water obtained from the reverse-osmosis membrane-separation apparatus, or the pressure of the seawater supplied to the reverse-osmosis membrane-separation apparatus for obtaining the same amount of fresh water increases, thus increasing the energy per unit amount of produced fresh water.

The present invention has been made in view of the above drawbacks. It is therefore an object of the present invention to provide an energy recovery apparatus, having flow resistors disposed respectively at the concentrated seawater port side and the seawater port side of the chamber, which can perform pressure transmission from the high-pressure concentrated seawater to the seawater while suppressing mixing of the two fluids at the boundary portion where the two fluids are brought into contact with each other by the effect for regulating the flow of fluid by the flow resistors to uniformize the flow of fluid even if the high-velocity flow of fluid collides with the central part of the flow resistor corresponding to the port diameter, and can prevent the discharge of the seawater having a high salt content which may occur by mixing of the seawater and the concentrated seawater in the energy recovery apparatus.

In particular, the object of the present invention is to provide an energy recovery apparatus having a configuration which can exert an effect for forming a uniform flow in a wide range of flow velocity and have less dependency on the flow velocity of fluid which flows in from the port, as the effect for forming a uniform flow by regulating the flow of fluid with the flow resistors.

Solution to Problem

In order to achieve the above object, according to a first aspect of the present invention, there is provided an energy recovery apparatus for converting pressure energy of concentrated seawater discharged from a reverse-osmosis membrane-separation apparatus to pressure energy of seawater in a seawater desalination system for producing fresh water from the seawater by supplying the seawater pressurized by a pump to the reverse-osmosis membrane-separation apparatus to separate the seawater into fresh water and concentrated seawater, the energy recovery apparatus comprising: a cylindrical chamber having a space for containing concentrated seawater and seawater therein, the chamber being installed such that a longitudinal direction of the chamber is placed in a vertical direction; a concentrated seawater port provided at a lower part of the chamber for supplying and discharging the concentrated seawater; a seawater port provided at an upper part of the chamber for supplying and discharging the seawater; a flow resistor provided at a concentrated seawater port side in the chamber; and a flow resistor provided at a seawater port side in the chamber; wherein each of the flow resistor provided at the concentrated seawater port side and the seawater port side comprises at least one perforated circular plate; and wherein each perforated circular plate has a plurality of holes formed in an outer circumferential area outside a hypothetical circle which is concentric with the perforated circular plate and has a predetermined diameter, the holes being formed so that an aperture ratio is gradually increased from an outer diameter of the hypothetical circle having the predetermined diameter toward an outer diameter of the perforated circular plate.

According to the present invention, the concentrated seawater is supplied to and discharged from the chamber through the concentrated seawater port provided at the lower part of the chamber, and the seawater is supplied to and discharged from the chamber through the seawater port provided at the upper part of the chamber. According to the present invention, the high-velocity fluid which has flowed into the chamber collides with the area having no hole located at the central portion of the perforated circular plate which has holes at an outer circumferential area outside a predetermined diameter, and is thus regulated so that the flow of fluid is dispersed in a radial direction of the chamber and slowed down, and then the fluid flows downstream from the area having holes at the outer circumferential area of the perforated circular plate. Therefore, the fluid which flows into the chamber and has a large stream at the central part of the chamber reduces its speed and is dispersed, and thus more uniform flow velocity distribution in the cross-section of the chamber can be formed. The concentrated seawater and the seawater which are regulated by the perforated circular plates form a boundary portion by a difference in specific gravity, and the concentrated seawater at the lower side pushes up the seawater and the seawater at the upper side pushes down the concentrated seawater by pushing and pulling. Thus, while the concentrated seawater and the seawater are separated one above the other and mixing of the concentrated seawater and the seawater at the boundary portion where the two fluids are brought into contact with each other is suppressed, the pressure can be transmitted from the high-pressure concentrated seawater to the seawater.

Further, because the holes are formed in the perforated circular plate so that an aperture ratio is gradually increased from an outer diameter of a hypothetical circle having a predetermined diameter toward an outer diameter of the perforated circular plate, even if the flow velocity of fluid which flows in from the port is changed to a wide range of flow velocity, the flow of fluid at the back side of the perforated circular plate is less likely to be changed, and thus a uniform flow can be formed.

According to a preferred aspect of the present invention, an area of the perforated circular plate that is free of the holes is an area of a star polygon which has a circle having a predetermined diameter as an incircle and a circle having a diameter equal to or smaller than the outer diameter of the perforated circular plate and greater than the diameter of the hypothetical circle as a circumcircle.

According to the present invention, by providing strength and weakness in the blockage portion, i.e. variation in an aperture ratio in a circumferential direction of the perforated plate, the flow of fluid in a radial direction at the downstream side after the fluid passes through the perforated plate is changed by the hole distribution, thereby regulating the flow of fluid so as to be uniformized in a longitudinal direction of the entire chamber. Further, this configuration has a high uniformizing action in a wide range of flow velocity even if the inflow velocity from the seawater port and the concentrated seawater port is changed, and thus has an action for uniformizing the high-velocity flow of fluid whose flow velocity is higher than the conventional flow velocity.

According to a preferred aspect of the present invention, the perforated circular plate serves as a first perforated plate, and a second perforated plate is provided to be spaced by a predetermined distance from the first perforated plate.

According to the present invention, the flow resistor can have a higher uniformizing effect because the flow of fluid which has been dispersed and regulated uniformly by the first perforated plate is further uniformized by the second perforated plate disposed at the downstream side of the first perforated plate.

According to a preferred aspect of the present invention, the energy recovery apparatus further comprises a doughnut-shaped circular plate having an opening at a center thereof provided between one of the concentrated seawater port and the seawater port or both of the concentrated seawater port and the seawater port, and the flow resistor.

According to the present invention, when the concentrated seawater is supplied to and discharged from the chamber through the concentrated seawater port provided at the lower part of the chamber, and the seawater is supplied to and discharged from the chamber through the seawater port provided at the upper part of the chamber, even if the seawater port and the concentrated seawater port are not located at the chamber axis, the fluid which has flowed in the chamber flows through the hole at the central portion of the circular plate toward the central portion of the flow resistor. Therefore, the flow of fluid is distributed over the entirety of the chamber from the central portion at the upstream side of the flow resistor without the deviated flow, and thus the flow of fluid at the downstream side of the flow resistor can be regulated more uniformly. The concentrated seawater and the seawater which are regulated by the flow resistors form a boundary portion by a difference in specific gravity, and the concentrated seawater at the lower side pushes up the seawater and the seawater at the upper side pushes down the concentrated seawater by pushing and pulling. Thus, while the concentrated seawater and the seawater are separated one above the other and mixing of the concentrated seawater and the seawater at the boundary portion where the two fluids are brought into contact with each other is suppressed, the pressure can be transmitted from the high-pressure concentrated seawater to the seawater.

According to a second aspect of the present invention, there is provided an energy recovery apparatus for converting pressure energy of concentrated seawater discharged from a reverse-osmosis membrane-separation apparatus to pressure energy of seawater in a seawater desalination system for producing fresh water from the seawater by supplying the seawater pressurized by a pump to the reverse-osmosis membrane-separation apparatus to separate the seawater into fresh water and concentrated seawater, the energy recovery apparatus comprising: a cylindrical chamber having a space for containing concentrated seawater and seawater therein, the chamber being installed such that a longitudinal direction of the chamber is placed in a vertical direction; a concentrated seawater port provided at a lower part of the chamber for supplying and discharging the concentrated seawater; a seawater port provided at an upper part of the chamber for supplying and discharging the seawater; a flow resistor provided at a concentrated seawater port side in the chamber; and a flow resistor provided at a seawater port side in the chamber; wherein each of the flow resistor provided at the concentrated seawater port side and the seawater port side comprises at least one perforated circular plate; wherein each perforated circular plate has a plurality of holes formed in an outer area outside a hypothetical circle having a predetermined diameter on the perforated circular plate, the outer area including a forming area where the holes are densely formed and a non-forming area where no hole is formed; and wherein a bundle-like collected jet flow comprising a group of jet flows which pass through the holes in the forming area is defined and a stationary fluid formed by blocking the flow passing through the perforated circular plate by the non-forming area is defined, the forming area and the non-forming area being alternately distributed in a circumferential direction of the outer area.

According to a preferred aspect of the present invention, shear takes place between the collected jet flow and the stationary fluid.

According to a third aspect of the present invention, there is provided an energy recovery apparatus for converting pressure energy of concentrated seawater discharged from a reverse-osmosis membrane-separation apparatus to pressure energy of seawater in a seawater desalination system for producing fresh water from the seawater by supplying the seawater pressurized by a pump to the reverse-osmosis membrane-separation apparatus to separate the seawater into fresh water and concentrated seawater, the energy recovery apparatus comprising: a cylindrical chamber having a space for containing concentrated seawater and seawater therein, the chamber being installed such that a longitudinal direction of the chamber is placed in a vertical direction; a concentrated seawater port provided at a lower part of the chamber for supplying and discharging the concentrated seawater; a seawater port provided at an upper part of the chamber for supplying and discharging the seawater; a flow resistor provided at a concentrated seawater port side in the chamber; and a flow resistor provided at a seawater port side in the chamber; wherein each of the flow resistor provided at the concentrated seawater port side and the seawater port side comprises at least one perforated circular plate; wherein each perforated circular plate has a plurality of holes formed in an outer area outside a hypothetical circle having a predetermined diameter on the perforated circular plate, the outer area including a forming area where the holes are formed and a non-forming area where no hole is formed; and wherein the non-forming area is joined to the hypothetical circle and forms a petal-shape non-forming area radially extending toward the outer circumference of the perforated circular plate.

According to a fourth aspect of the present invention there is provided an energy recovery apparatus for converting pressure energy of concentrated seawater discharged from a reverse-osmosis membrane-separation apparatus to pressure energy of seawater in a seawater desalination system for producing fresh water from the seawater by supplying the seawater pressurized by a pump to the reverse-osmosis membrane-separation apparatus to separate the seawater into fresh water and concentrated seawater, the energy recovery apparatus comprising: a cylindrical chamber having a space for containing concentrated seawater and seawater therein, the chamber being installed such that a longitudinal direction of the chamber is placed in a vertical direction; a concentrated seawater port provided at a lower part of the chamber for supplying and discharging the concentrated seawater; a seawater port provided at an upper part of the chamber for supplying and discharging the seawater; a flow resistor provided at a concentrated seawater port side in the chamber; and a flow resistor provided at a seawater port side in the chamber; wherein each of the flow resistor provided at the concentrated seawater port side and the seawater port side comprises at least one perforated circular plate; and wherein each perforated circular plate has a plurality of holes formed in an outer area outside a hypothetical circle having a predetermined radius from the center of the perforated circular plate, a plurality of areas where no hole is formed are provided in a circumferential direction of the outer area, and each of the plurality of areas spreads toward an outer diameter of the perforated circular plate in a substantially triangular shape having a bottom side on an arc formed by the hypothetical circle.

According to the present invention, there is provided a seawater desalination system for producing fresh water from seawater by supplying the seawater pressurized by a pump to a reverse-osmosis membrane-separation apparatus to separate the seawater into fresh water and concentrated seawater, the seawater desalination system comprising: the above energy recovery apparatus for converting pressure energy of the concentrated seawater discharged from the reverse-osmosis membrane-separation apparatus to pressure energy of the seawater.

According to the present invention, the pressure energy of the high-pressure concentrated seawater discharged from the reverse-osmosis membrane-separation apparatus can be directly transmitted to the seawater, and mixing of the two fluids when the concentrated seawater and the seawater are pushed and pulled can be suppressed. Therefore, the seawater having a high salt content is not discharged from the energy recovery apparatus, and thus the system can be operated without raising supply pressure of the seawater to the reverse-osmosis membrane-separation apparatus. Accordingly, the electric power required for operating the system can be reduced.

Advantageous Effects of Invention

According to the present invention, the following, effects can be achieved.

1) The high-velocity fluid which has flowed into the chamber is dispersed in a radial direction of the chamber and is slowed down at the area having no hole at the central part of the perforated circular plate which has holes at an outer circumferential area outside a predetermined diameter, and then the fluid flows downstream from the area having the holes at the outer circumferential area of the perforated circular plate. Further, by providing strength and weakness in the blockage portion, i.e. variation in an aperture ratio in a circumferential direction of the perforated plate, the flow of fluid in a radial direction at the downstream side after the fluid passes through the perforated plate is changed by the hole distribution. Therefore, the action for forming more uniform flow in the cross-section of the chamber is remarkably improved by decelerating and dispersing the fluid which flows into the chamber and has a large stream. By the uniformizing action for regulating the flow of fluid by the flow resistor comprising the perforated circular plate, while mixing of the concentrated seawater and the seawater at the boundary portion where the two fluids are brought into contact with each other is suppressed, the pressure can be transmitted from the high-pressure concentrated seawater to the seawater. Further, because the holes are formed in the perforated circular plate so that an aperture ratio is gradually increased from an outer diameter of a hypothetical circle having a predetermined diameter toward an outer diameter of the perforated circular plate, even if the flow velocity of fluid which flows in from the port is changed to a wide range of flow velocity, the flow of fluid at the back side of the perforated circular plate is less likely to be changed, and thus a uniform flow can be formed.

2) Because mixing of the concentrated seawater and the seawater in the chamber due to turbulent flow diffusion can be suppressed and the seawater having a high salt content is not delivered to the reverse-osmosis membrane-separation apparatus, the reverse-osmosis membrane-separation apparatus can provide its sufficient performance and the replacement cycle of the reverse-osmosis membrane itself can be prolonged.

DESCRIPTION OF EMBODIMENTS

Figure 1:
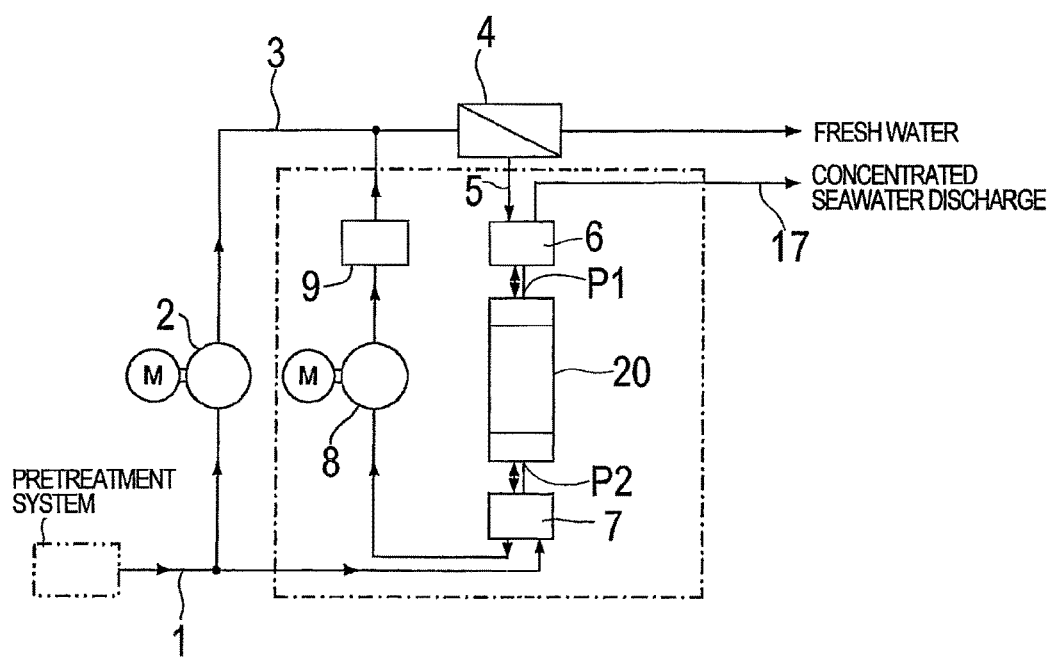
FIG. 1 is a schematic view showing a configuration example of a seawater desalination system according to the present invention.

An energy recovery apparatus according to preferred embodiments of the present invention will be described below with reference to FIGS. 1 through 20. Identical or corresponding parts are denoted by identical reference numerals in FIGS. 1 through 20 and will not be described in duplication.

FIG. 1 is a schematic view showing a configuration example of a seawater desalination system according to the present invention. As shown in FIG. 1, seawater pumped into the seawater desalination system by an intake pump (not shown) is processed to have certain water qualities by a pretreatment system, and then the pretreated seawater is delivered via a seawater supply line 1 into a high-pressure pump 2 that is driven by a motor M. The seawater which has been pressurized by the high-pressure pump 2 is supplied via a discharge line 3 to a reverse-osmosis membrane-separation apparatus 4 having a reverse-osmosis membrane (RO membrane). The reverse-osmosis membrane-separation apparatus 4 separates the seawater into concentrated seawater with a high salt content and fresh water with a low salt content and obtains the fresh water from the seawater. At this time, the concentrated seawater with a high salt content is discharged from the reverse-osmosis membrane-separation apparatus 4. and the discharged concentrated seawater still has a high-pressure. A concentrated seawater line 5 for discharging the concentrated seawater from the reverse-osmosis membrane-separation apparatus 4 is connected via a control valve 6 to a concentrated seawater port P1 of an energy recovery chamber 20. A seawater supply line 1 for supplying the pretreated seawater having a low pressure is branched at an upstream side of the high-pressure pump 2 and is connected via a valve 7 to a seawater port P2 of the energy recovery chamber 20. The energy recovery chamber 20 performs energy transmission from the concentrated seawater to the seawater while separating two fluids by a boundary region between the concentrated seawater and the seawater.

The seawater pressurized by utilizing a pressure of the concentrated seawater in the energy recovery chamber 20 is supplied via a valve 7 to a booster pump 8. Then, the seawater is further pressurized by the booster pump 8 so that the seawater has the same pressure level as the discharge line 3 of the high-pressure pump 2, and the pressurized seawater merges via a valve 9 into the discharge line 3 of the high-pressure pump 2 and is then supplied to the reverse-osmosis membrane-separation apparatus 4. On the other hand, the concentrated seawater which has pressurized the seawater and lost the energy is discharged from the energy recovery chamber 20 via the control valve 6 to a concentrated seawater discharge line 17.

When the pressure of the discharge line 3 of the high-pressure pump 2 is 6.5 MPa for example, the pressure is slightly lowered by pressure loss of the RO membrane module of the reverse-osmosis membrane-separation apparatus 4, and the concentrated seawater having a pressure of 6.4 MPa is discharged from the reverse-osmosis membrane-separation apparatus 4. When the pressure energy of the concentrated seawater acts on the seawater, the seawater is pressurized to the same pressure (6.4 MPa), but the pressure is decreased by pressure loss of the energy recovery apparatus itself when the seawater flows through the energy recovery apparatus, and the seawater having a pressure of 6.3 MPa for example is discharged from the energy recovery apparatus. The booster pump 8 slightly pressurizes the seawater from 6.3 MPa to 6.5 MPa, and the seawater merges into the discharge line 3 of the high-pressure pump 2 and is supplied to the reverse-osmosis membrane-separation apparatus 4. The booster pump 8 only needs to pressurize the seawater to make up for such a small pressure loss, and thus a small amount of energy is consumed in the booster pump 8.

It is assumed that 100% of an amount of seawater is supplied to the reverse-osmosis membrane-separation apparatus 4, 40% of the amount of the seawater can be changed to fresh water. The remaining 60% of the amount of the seawater is concentrated and discharged from the reverse-osmosis membrane-separation apparatus 4 as concentrated seawater. Then, the pressure of the 60% concentrated seawater is transmitted and recovered by the seawater in the energy recovery apparatus, and the seawater having an increased pressure is discharged from the energy recovery apparatus. Therefore, the seawater having a high pressure equivalent to the seawater pressurized by the high-pressure pump can be obtained, with a small amount of energy consumed by the booster pump. Thus, the energy which is consumed by the high-pressure pump to produce the fresh water can be about half of the energy in the case of no energy recovery apparatus.

Figure 2:
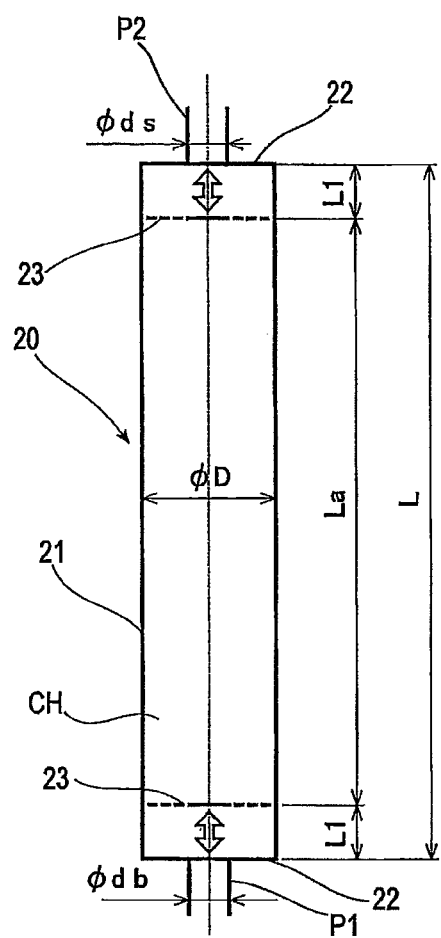
FIG. 2 is a schematic cross-sectional view showing an energy recovery chamber of the present invention which is applied to the seawater desalination system shown in FIG. 1.

FIG. 2 is a schematic cross-sectional view showing the energy recovery chamber of the present invention which is applied to the seawater desalination system shown in FIG. 1. As shown in FIG. 2, the energy recovery chamber 20 comprises a long chamber body 21 having a cylindrical shape, and end plates 22 for closing both opening ends of the chamber body 21. A chamber CH is formed in the chamber body 21, and a concentrated seawater port P1 is formed in one of the end plates 22 and a seawater port P2 is formed in the other of the end plates 22.

The energy recovery chamber 20 is installed vertically. The chamber CH is disposed vertically in consideration of the effect of a difference in specific gravity between the concentrate seawater and the seawater, and the port P1 for the concentrated seawater having large specific gravity is disposed at a lower part of the chamber CH and the port P2 for the seawater having small specific gravity is disposed at an upper part of the chamber CH. That is, the long chamber body 21 having a cylindrical shape is installed such that a longitudinal direction (axial direction) of the chamber is placed in a vertical direction. The concentrated seawater port P1 is provided at the lower part of the chamber CH for supplying and discharging the concentrated seawater at the lower part of the chamber CH, and the seawater port P2 is provided at the upper part of the chamber CH for supplying and discharging the seawater at the upper part of the chamber CH. The entire length of the chamber CH is L. In the chamber CH, a flow resistor 23 is disposed at a position spaced by a distance L1 in the axial direction from the concentrated seawater port P1, and a flow resistor 23 is disposed at a position spaced by a distance L1 in the axial direction from the seawater port P2.

Figure 3:
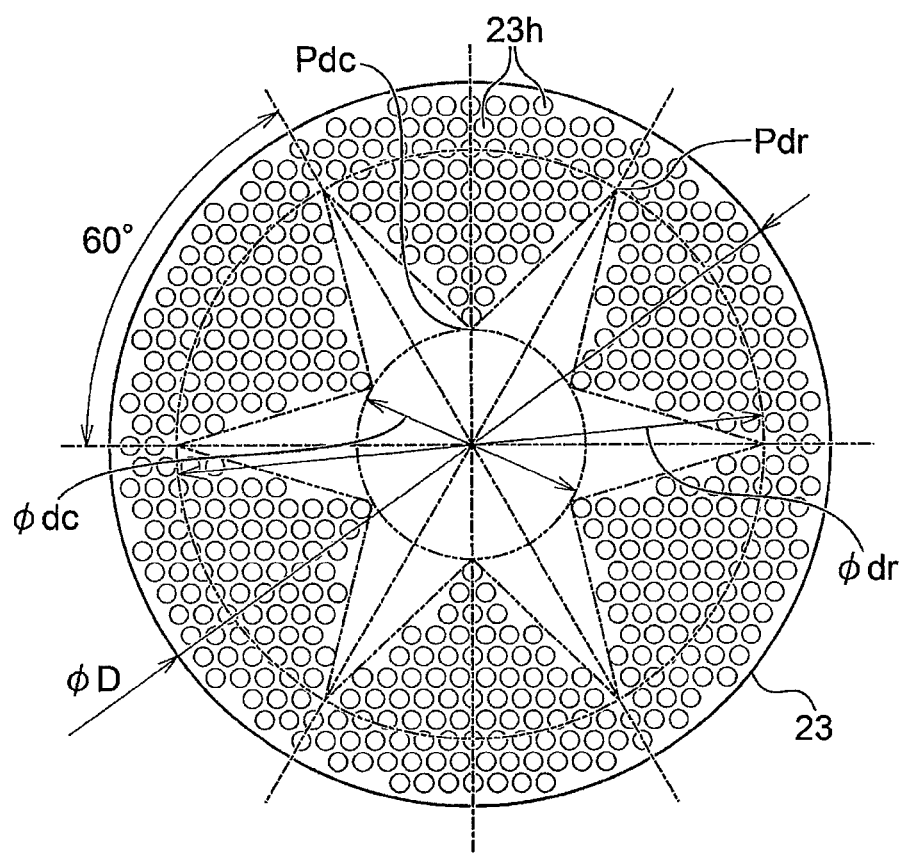
FIG. 3 is a plan view showing an example of the flow resistor.

FIG. 3 is a plan view showing an example of the flow resistor. As shown in FIG. 3, the flow resistor 23 has a circular plate shape having an outer diameter ($\phi$D) equal to the inner diameter of the chamber. The flow resistor 23 comprises a single perforated plate which has a plurality of small holes 23$h$ having a diameter $\phi dk1$ formed outside a hypothetical polygon (particularly, a concave polygon, a star hexagon (six-pointed star, hexagram), and the like) and has no hole inside the hypothetical polygon (central side). The hypothetical polygon has a central hypothetical circle (diameter: $\phi dc$) as an incircle and an outer hypothetical circle (diameter: $\phi dr$) as a circumcircle. Specifically, the flow resistor 23 comprises a perforated plate which is blocked in its central portion and in part of its outer circumferential portion. In FIG. 3, the points of intersection between the incircle as a hypothetical circle and the hypothetical polygon are denoted by Pdc, and the points of intersection between the circumcircle as a hypothetical circle and the hypothetical polygon are denoted by Pdr.

The diameter ($\phi dc$) of the central hypothetical circle on the perforated plate is equal to or slightly greater than the inner diameter $\phi ds$ of the seawater port and the inner diameter $\phi db$ of the concentrated seawater port, so that the high-velocity flow of fluid flowing in from each of the ports collides with the blockage portion and is slowed down. However, if the blockage portion is excessively larger than each of the ports, the flows of fluid passing through a plurality of small holes 23$h$ provided at an outer circumferential side are localized in an outer circumferential region, thus making the flow uniformizing action small adversely. Therefore, the diameter of the central hypothetical circle is substantially the same as the inner diameter of each of the ports.

The central hypothetical circle of the flow resistor 23 is positioned so as to be concentric with the outer circumference of the circular plate of the flow resistor 23. As shown in FIG. 2, the seawater port and the concentrated seawater port are disposed on the axis of the cylindrical chamber so that the high-velocity flow of fluid flowing into the chamber from each of the ports collides with the blockage portion that is defined by the central hypothetical circle.

The diameter ($\phi dr$) of the hypothetical circle that circumscribes the star hexagon is smaller than the outer diameter ($\phi$D) of the flow resistor 23.

The flow resistor 23 comprising the perforated plate which is blocked by the star hexagon, has a function to regulate the flow of fluid at the downstream side of the flow resistor 23 so as to be uniformized in the entire chamber by imparting an appropriate flow resistance to the flow of fluid at the upstream side of the flow resistor 23 in the chamber CH.

The outer edges that interconnect adjacent corners of the polygon may not necessarily be straight sides.

Figure 4:
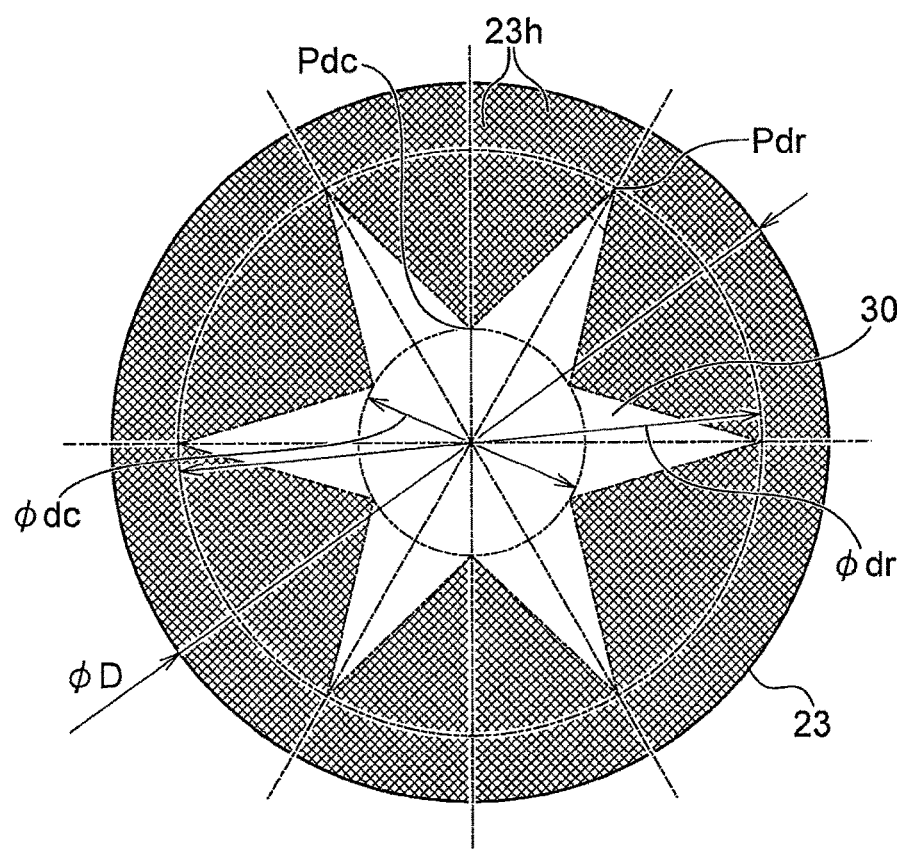
FIG. 4 is a view showing an example of another flow resistor, and a plan view showing the flow resistor comprising a single mesh plate.

FIG. 4 is a view showing an example of another flow resistor, and a plan view showing a flow resistor which comprises a single mesh plate. As shown in FIG. 4, the flow resistor 23 comprises a mesh material which is formed into a circular plate shape having an outer diameter $\phi$D by weaving a wire material. Another plate 30, which is of a star hexagon having a hypothetical circle (diameter: $\phi dc$) at the central part as an incircle and a hypothetical circle (diameter: ($\phi dr$) at the outer circumference as a circumcircle, is attached to the circular plate comprising the mesh material. A fluid flows through a portion, where the mesh material is exposed, outside the star hexagon, but does not flow through the plate 30 having the star hexagonal shape.

The flow resistor 23 having a configuration which is blocked by the star hexagon, has a function to regulate the flow of fluid at the downstream side of the flow resistor 23 so as to be uniformized in the entire chamber by imparting an appropriate flow resistance to the flow of fluid at the upstream side of the flow resistor 23 in the chamber CH. The perforated plate shown in FIG. 3 and the mesh plate shown in FIG. 4 are collectively referred to as a perforated circular plate.

Figure 5:
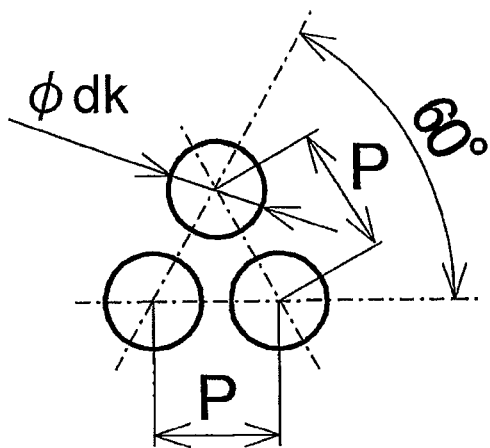
FIG. 5 is an enlarged plan view of holes of the perforated plate in FIG. 3.

The configuration in which a blockage portion having a star hexagonal shape is provided at the central portion of the perforated circular plate shown in FIG. 3 or the circular mesh shown in FIG. 4 is characterized as follows:

In the case of a uniform perforated plate, a certain aperture ratio is defined by the shape of holes (diameter if the holes are circular holes), the distance between adjacent holes (pitch), and the layout of the holes. For example, in the case of a general perforated plate in which the circular holes have a diameter dk, are spaced at a distance (pitch) P, and are arranged in a 60-degree staggered pattern as shown in FIG. 5, the aperture ratio APR is defined by the following equation:

$$APR = 90.6 \times dk^2/P^2 \quad (1)$$

Figure 6:
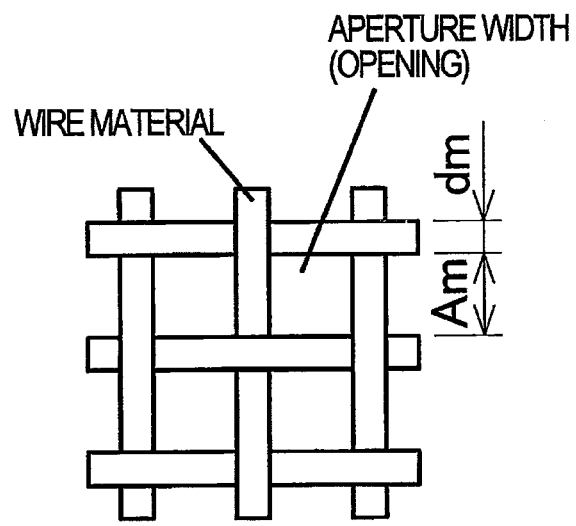
FIG. 6 is an enlarged plan view of a wire material and opening portions of a mesh plate in FIG. 4.

In the case of a mesh material formed by weaving a wire material as shown in FIG. 6, when the aperture width between adjacent wires is represented by Am and the diameter of the wire material is represented by dm, the aperture ratio APR is defined by the following equation:

$$APR = Am^2(Am+dm)^2 \quad (2)$$

Figure 7A:
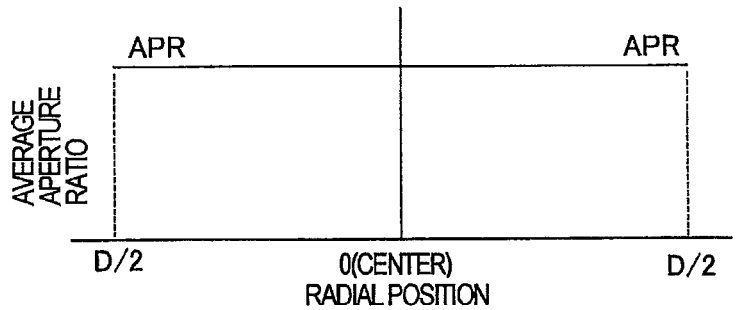
FIGS. 7(a), 7(b), and 7(c) are graphs showing average aperture ratios at diametrical positions of three types of flow resistors.
Figure 7B:
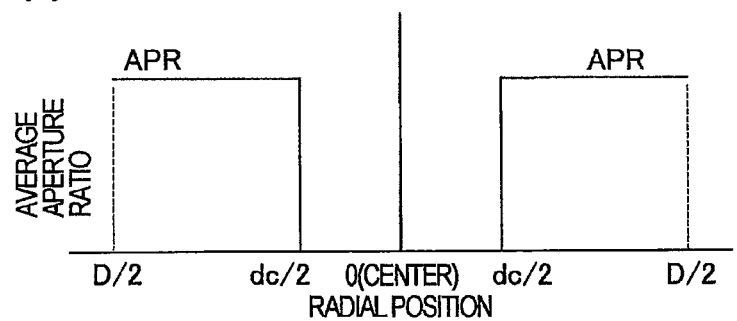
Figure 7C:
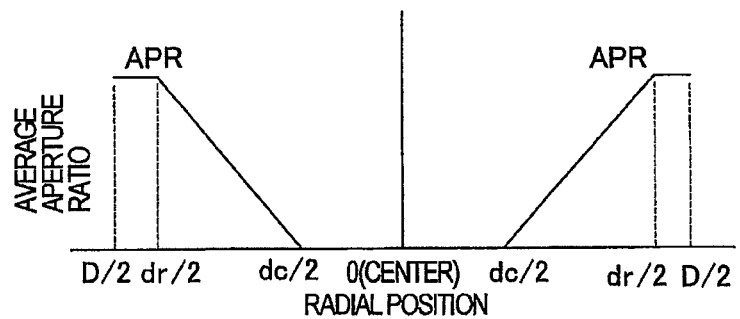

FIGS. 7(a), 7(b), and 7(c) are graphs showing aperture ratios at radial positions on circular plates.

If there is no blockage portion, the entire surface of the circular plate has a uniform aperture ratio on the average, and thus the aperture ratio (APR) is constant at any radial position on the circular plate, as shown in FIG. 7(a).

Figure 25:
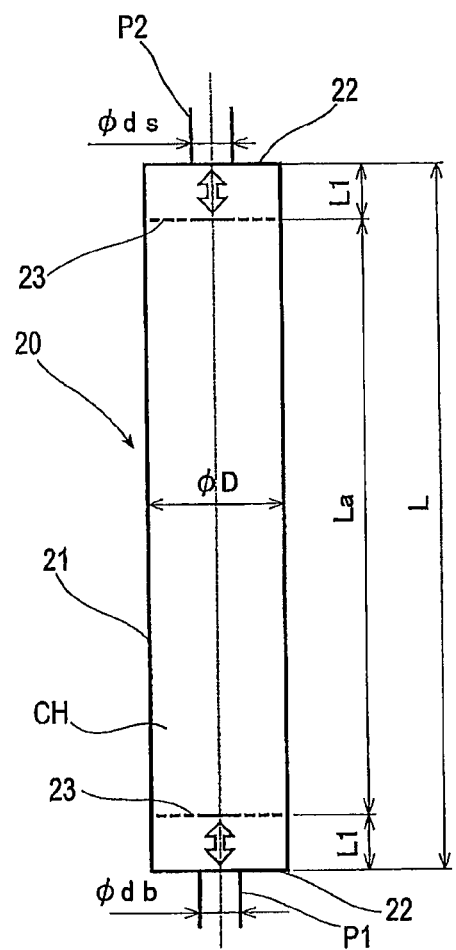
FIG. 25 is a cross-sectional view showing an energy recovery chamber which has flow resistors having a circular blockage portion at its center, which has been proposed in Japanese patent application No. 2013-078012.
Figure 26:
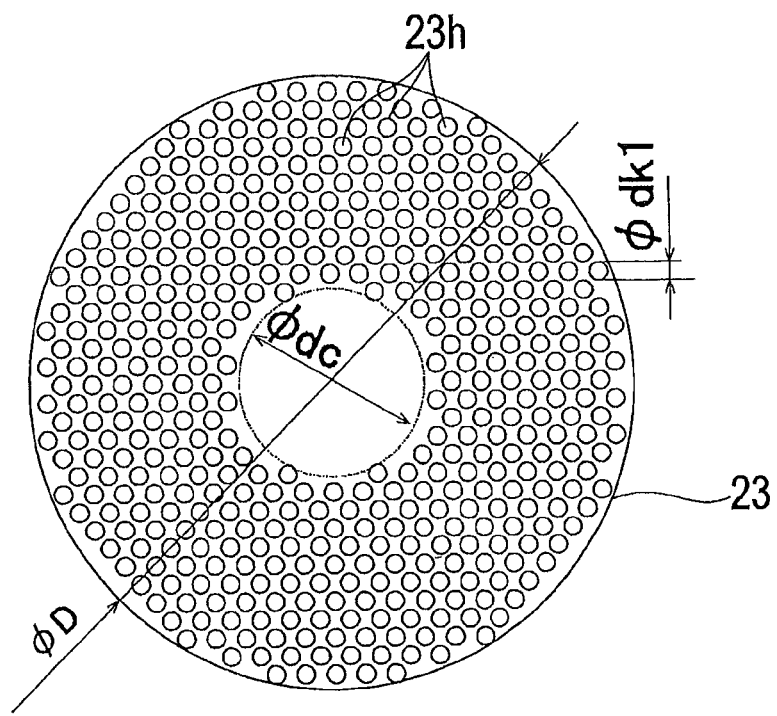
FIG. 26 is a plan view showing a perforated plate which has a circular blockage portion, which has been proposed in Japanese patent application No. 2013-078012.

In the case of a perforated plate having a circular blockage portion at its central part (see FIGS. 25 and 26), the aperture ratio (APR) at respective diametrical positions becomes zero in a central blockage area having a diameter dc and becomes constant in an area whose diameter is greater than the diameter dc. Thus, the aperture ratio at radial positions on the perforated plate shows the relationship shown in FIG. 7(b).

On the other hand, in the case where a blockage portion having a star hexagonal shape is provided according to the present invention, the aperture ratio APR becomes zero in a central blockage area having a diameter dc, and becomes a certain APR which is calculated as uniform porosity or uniform mesh in an area outside the circumcircle (diameter φdr) of the star hexagon. Therefore, the aperture ratio is gradually increased from zero to APR, and the aperture ratio at radial positions shows the relationship shown in FIG. 7(c).

As described above, the present invention is characterized by the configuration in which the aperture ratio is gradually increased toward the outer circumference of the circular plate.

The aperture ratio represented by the vertical axis of each of the graphs shown in FIGS. 7(a), 7(b), and 7(c) is an average aperture ratio at each radial position.

If the star polygon is a star hexagon and the angle formed between two hypothetical lines which interconnect two adjacent acute-angle vertexes in an outer circumferential area of the circular plate and the center of the perforated circular plate is 60 degrees as shown in FIG. 3, and if the holes are arranged in a 60-degree staggered pattern as shown in FIG. 5 and the central line of the 60-degree staggered pattern is aligned with the hypothetical line on the star hexagon, then the holes can be rotational symmetry with respect to the center of the perforated plate. In this manner, the holes that are formed and arranged in the rotational symmetry are expected to perform a higher action to regulate the flow of fluid at the downstream side of the perforated plate so as to be uniformized in the entire chamber than the configuration which is not rotational symmetry.

FIGS. 8(a), 8(b) through 10(a), 10(b) are views showing the flow distribution of CFD (Computational Fluid Dynamics) in the vicinity of the seawater port when the seawater flows into the chamber in the case where the flow resistor 23 comprising a perforated circular plate whose central portion is blocked in a star hexagonal shape is installed horizontally. Arrows in figures are as follows: Flow velocity of fluid is shown by a length of arrow and flow direction of fluid is shown by a direction of arrow.

Figure 8A:
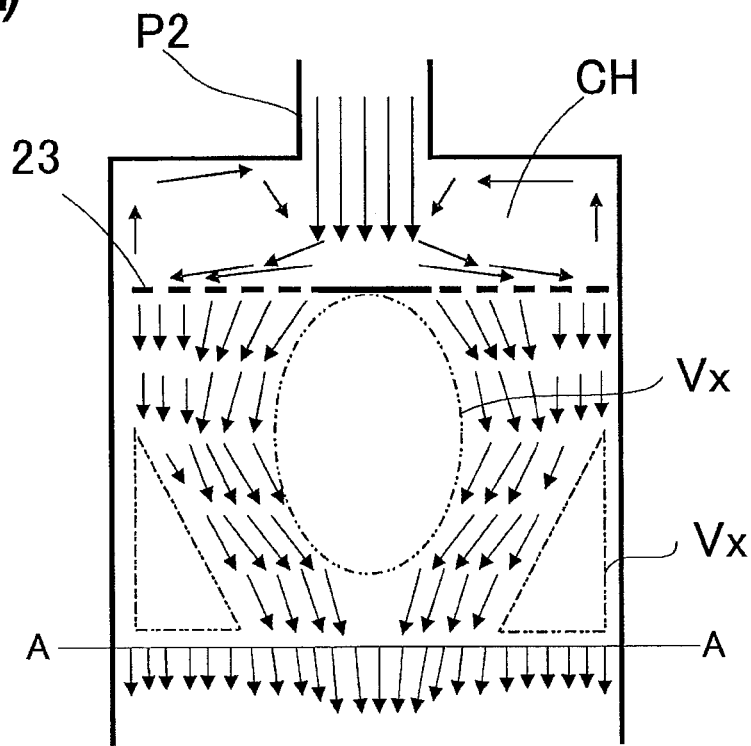
FIGS. 8(a), 8(b) are views showing the flow distribution of CFD (Computational Fluid Dynamics) in the vicinity of the seawater port in the case where the flow resistor comprising a perforated plate whose central portion is blocked in a star hexagonal shape is installed horizontally as shown in FIG. 2.
Figure 8B:
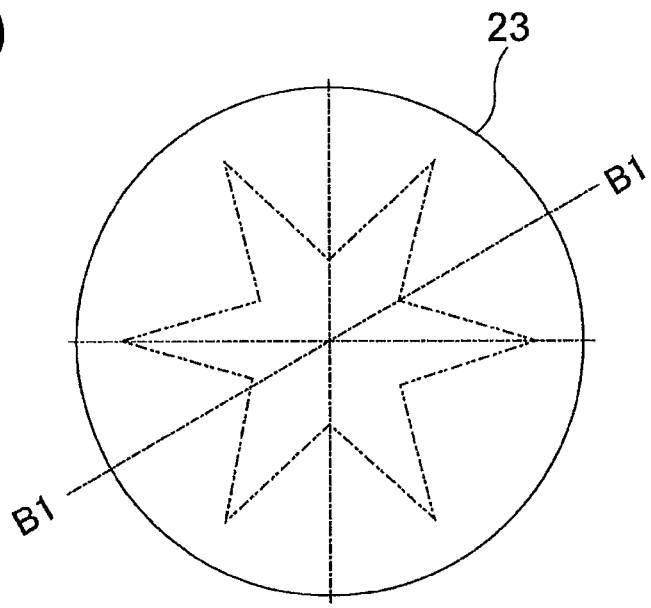

FIGS. 8(a) and 8(b) are views showing the flow distribution in the vicinity of the seawater port of the chamber when the seawater flows into the chamber, in the B1-B1 cross-section passing through points of intersection between the star hexagon and the incircle on the perforated plate. Specifically, FIG. 8(b) is a plan view of the flow resistor 23 having a structure identical to the structure shown in FIG. 3, and FIG. 8(a) is a view showing the flow distribution in the vicinity of the seawater port of the chamber, in the B1-B1 cross-section of FIG. 8(b). In FIG. 8(b), the small holes 23h outside the star hexagon are omitted from illustration.

As shown in FIG. 8(a), because the fluid flows into the chamber CH from the seawater port P2 having a small diameter, the fluid near the port of the chamber has a velocity distribution having a large stream at the central part of the chamber. The high-velocity flow of fluid at the central part collides with the circular blockage portion, at the center of the perforated plate, facing the port, and then the flow of fluid is directed horizontally along the plate toward the outer circumference of the chamber. The fluid passes through the perforated plate only from the small holes formed at the outer circumferential portion of the perforated plate and flows downstream, and part of the horizontal flow of fluid is directed upwardly along the side surface of the chamber, thus generating large vortices at the outer circumferential portion of an upstream space that is partitioned by the perforated plate. At this time, the flow of fluid collides with the blockage portion of the perforated plate and is then directed toward the outer circumference of the chamber, and the high-velocity fluid which flows into the chamber from the port is slowed down. The flow of fluid which has passed through the small holes at the outer circumferential portion of the perforated plate is directed towards the outer circumferential side once at its central part, and then gathers in the central part of the chamber again. This is because the vortex represented by Vx is generated at the back side of the blockage portion of the perforated plate. Further, vortexes Vx are also generated in an outer circumferential region at the upstream side of the evaluation section A-A that is spaced by a predetermined distance from the perforated plate. Here, the vortexes Vx become complex flows having velocities that include vertical components with respect to a two-dimensional plane of the cross-section shown in FIG. 8(a).

Figure 9A:
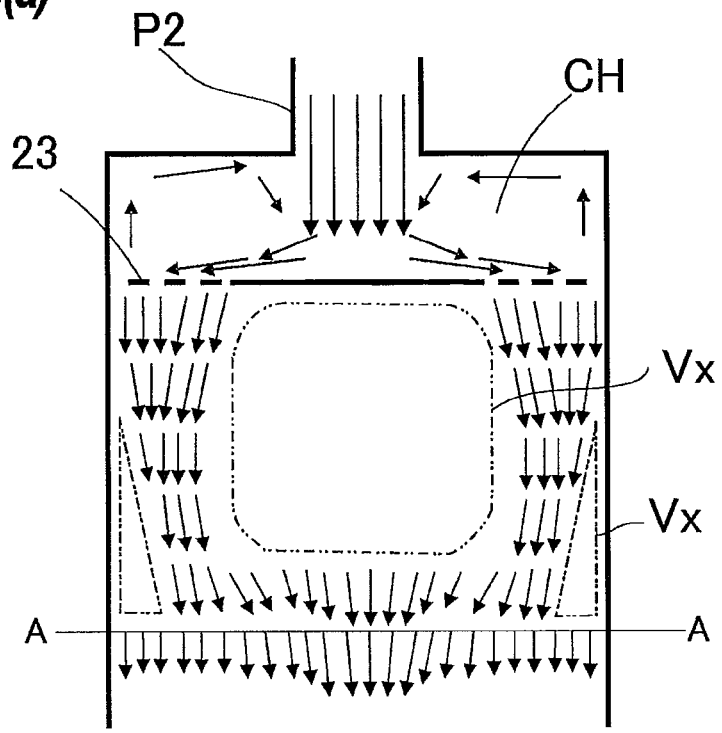
FIGS. 9(a), 9(b) are views showing the flow distribution of CFD (Computational Fluid Dynamics) in another cross-section in the vicinity of the seawater port in the case where the flow resistor comprising a perforated plate whose central portion is blocked in a star hexagonal shape is installed horizontally as shown in FIG. 2.
Figure 9B:
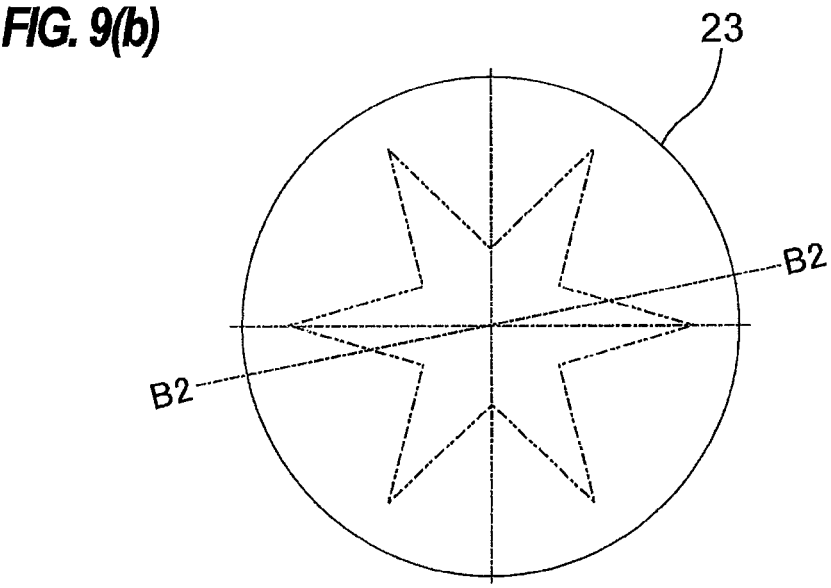

FIGS. 9(a) and 9(b) are views showing the flow distribution of CFD (Computational Fluid Dynamics) in the vicinity of the seawater port of the chamber when the seawater flows into the chamber, in the B2-B2 cross-section passing through the intermediate between a point of intersection between the star hexagon and the incircle and a point of intersection between the star hexagon and the circumcircle on the perforated circular plate. Specifically, FIG. 9(b) is a plan view of the flow resistor 23 having a structure identical to the structure shown in FIG. 3, and FIG. 9(a) is a view showing the flow distribution in the vicinity of the seawater port of the chamber, in the B2-B2 cross-section of FIG. 9(b). In FIG. 9(b), the small holes 23h outside the star hexagon are omitted from illustration.

As shown in FIG. 9(a), vortexes Vx are generated at the back, side of the blockage portion of the perforated plate and in the outer circumferential region at the upstream side of the evaluation section A-A, as with the results shown in FIG. 8(a). However, the central vortex Vx shown in FIG. 9(a) is larger than the central vortex Vx shown in FIG. 8(a), and the outer circumferential vortexes Vx shown in FIG. 9(a) are smaller than the outer circumferential vortexes Vx shown in FIG. 8(a). The main flows in a two-dimensional plane of the cross-section shown in FIG. 9(a) are directed in a downward direction.

Figure 10A:
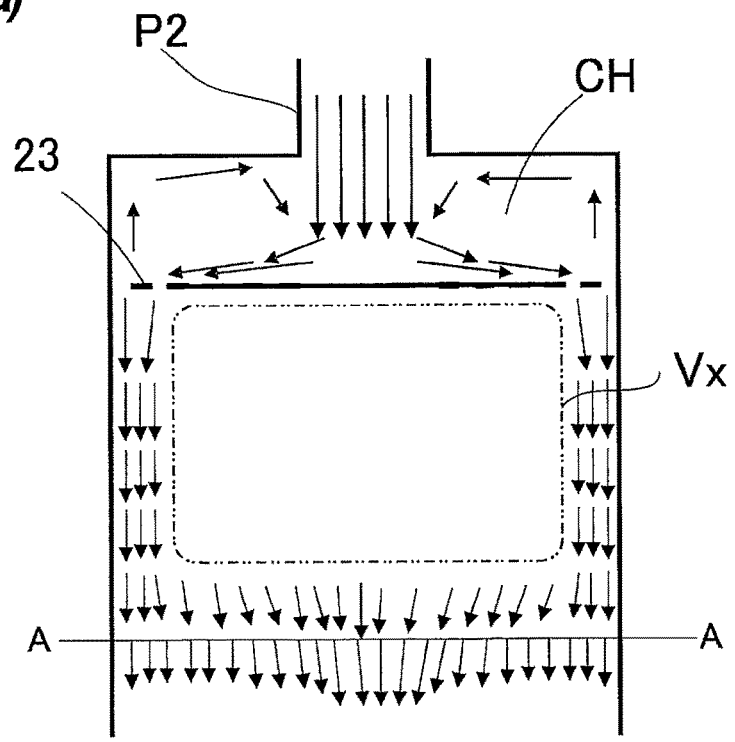
FIGS. 10(a), 10(b) are views showing the flow distribution of CFD (Computational Fluid Dynamics) in still another cross-section in the vicinity of the seawater port in the case where the flow resistor comprising a perforated plate whose central portion is blocked in a star hexagonal shape is installed horizontally as shown in FIG. 2.
Figure 10B:
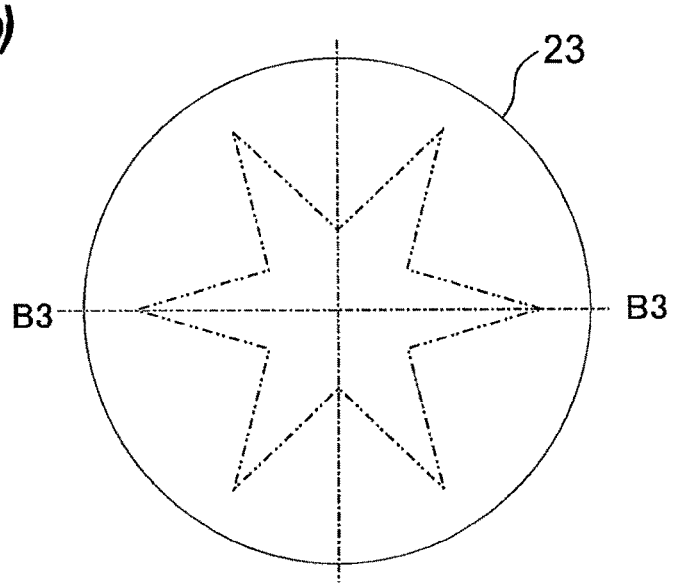

FIGS. 10(a) and 10(b) are views showing the flow distribution of CFD (Computational Fluid Dynamics) in the vicinity of the seawater port of the chamber when the seawater flows into the chamber, in the B3-B3 cross-section passing through points of intersection between the star hexagon and the circumcircle on the perforated plate. Specifically, FIG. 10(b) is a plan view of the flow resistor 23 having a structure identical to the structure shown in FIG. 3, and FIG. 10(a) is a view showing the flow distribution in the vicinity of the seawater port of the chamber, in the B3-B3 cross-section of FIG. 10(b). In FIG. 10(b), the small holes 23h outside the star hexagon are omitted from illustration.

As shown in FIG. 10(a), the central blockage portion has a greater proportion, and thus flows along the cylindrical wall in the chamber from the outer circumferential portion of the chamber are formed. A large vortex Vx is formed in the central part of the chamber, and complex flows having velocities that include vertical components with respect to a two-dimensional plane of the cross-section shown in FIG. 10(a) are formed. In this case, a state in which a plurality of complex vortexes are mixed in the vortex Vx is developed.

Although the behavior of the flow in the B1-B1 cross-section and the behavior of the flow in the B3-B3 cross-section are extremes, they can take place in limited pinpoint cross-sections in each of the three cross-sections. The behavior of the flow intermediate between the extreme behaviors of the flows becomes nearly the same as the behavior of the flow in the B2-B2 cross-section. As a consequence of the behaviors of the flows in the three types of cross-sections, the flows at the back side of the perforated circular plate are less likely to vary, but can be uniformized even if the flow velocity of the fluid flowing in from the port is changed over a wide range.

Figure 27:
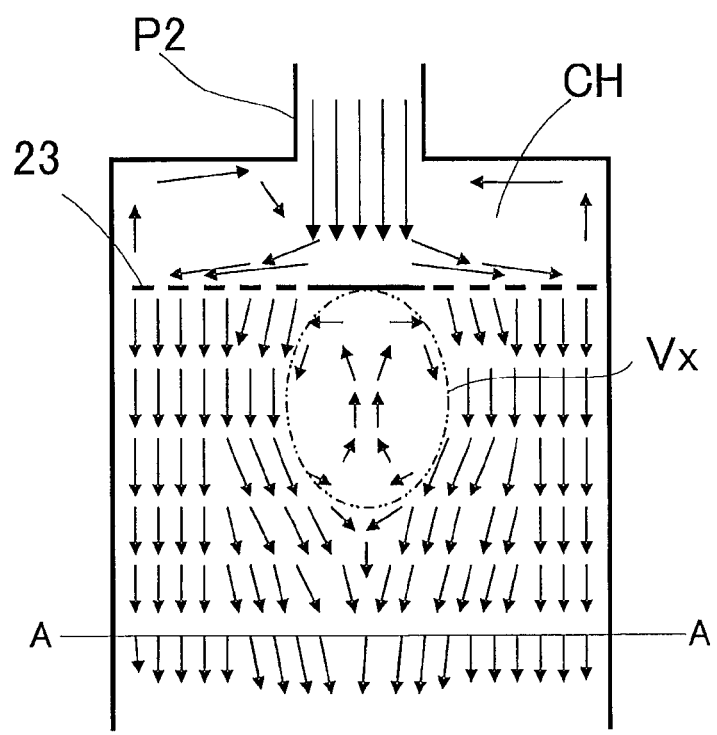
FIG. 27 is a view showing the flow distribution by CFD (Computational Fluid Dynamics) of the interior of the chamber in the case where high-velocity seawater flows into the chamber from the seawater port located in the vicinity of the upper part of the chamber in FIG. 25.
Figure 28:
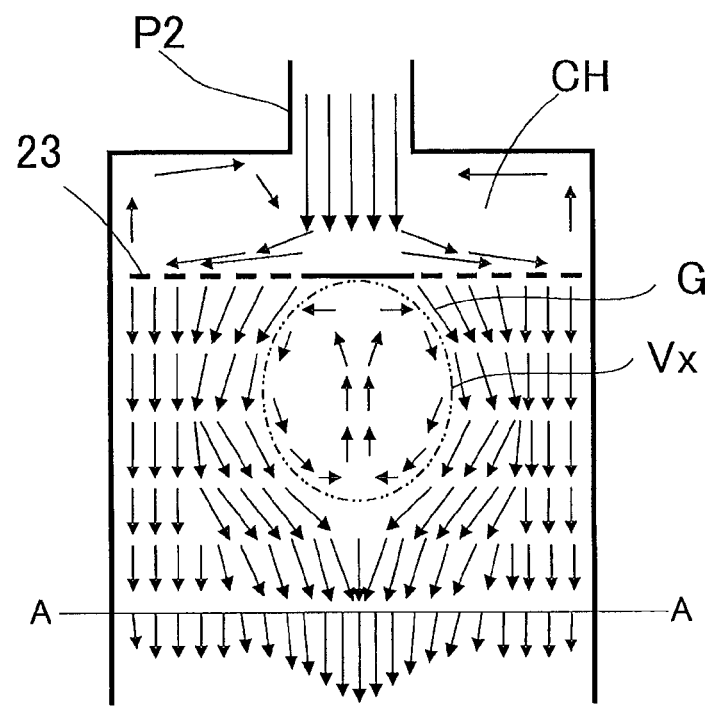
FIG. 28 is a view showing the flow distribution by CFD (Computational Fluid Dynamics) of the interior of the chamber in the case where higher-velocity seawater flows into the chamber from the seawater port located in the vicinity of the upper part of the chamber in FIG. 25.

The flows shown in FIGS. 27 and 28 gather only in the central part of the chamber. However, by providing a radial distribution of aperture ratios allocated to the blockage portion, the main flows that pass through the perforated plate are dispersed in a radial direction of the chamber.

Similarly, the fluid which has flowed in from the concentrated seawater port P1 disposed at the lower part of the chamber collides with the blockage portion at the central part of the perforated plate and is thus slowed down, and thus a uniform flow is formed from the small holes at the circumferential portion of the perforated plate over the entire plane of the chamber. Therefore, the fluid between the perforated plates flows in and out in a suite of a uniform flow in the horizontal cross-section of the chamber, and thus uniform pushing and pulling of the seawater and the concentrated seawater are performed in the entire cross-section. By this action, when the seawater and the concentrated seawater are pushed and pulled, mixing of the seawater and the concentrated seawater having different salt concentrations can be suppressed.

Here, in the energy recovery apparatus according to the present invention, the pushing and pulling are switched so that the mixing zone of the seawater and the concentrated seawater reciprocates between the flow resistors which are respectively disposed at the seawater port P2 side and the concentrated seawater port P1 side in the chamber. Therefore, the mixing zone of the seawater and the concentrated seawater is present in the portion represented by La between the flow resistors 23, 23 in FIG. 2. The seawater flowing in from the seawater port P2 provided at the upper part of the chamber becomes a uniform flow by the flow resistor 23 in the horizontal cross-section of the chamber at the downstream side of the flow resistor 25, but this flow is changed also by flow resistance of fluid flowing out from the concentrated seawater port P1 side as a discharge side. Specifically, this flow is changed also by the combination with the flow resistor 23 disposed at the concentrated seawater port side. Therefore, the Computational Fluid Dynamics at the lime of inflow shown in FIGS. 8(a), (b) through 10(a), (b) takes into account the resistance of the flow resistor 23 at the discharge side.

In this manner, the uniformizing action of flow by the flow resistor at the inflow side in the present invention varies depending on the arrangement of the flow resistor and the port at the discharge side. Because the energy recovery apparatus repeats inflow and discharge of the seawater and the concentrated seawater alternately, in addition to uniformization of flow in one direction, the flow of discharge when the fluid flows in the opposite direction should be considered.

Figure 11A:
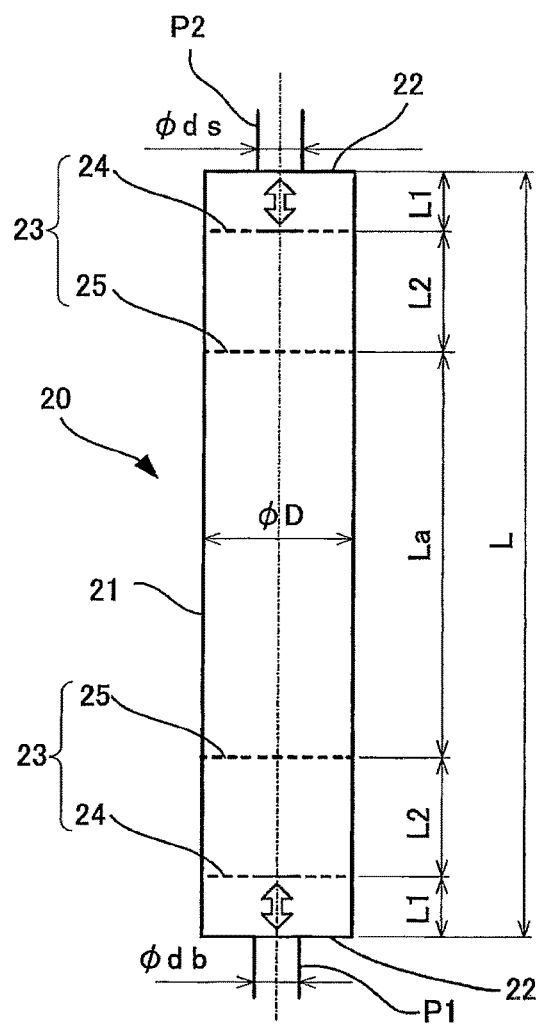
FIG. 11(a) is a schematic cross-sectional view showing an energy recovery chamber of an energy recovery apparatus according to another embodiment of the present invention.

FIG. 11(a) is a schematic cross-sectional view showing an energy recovery chamber of an energy recovery apparatus according to another embodiment of the present invention. As shown in FIG. 11(a), in the chamber, a first perforated plate 24 is provided horizontally at a positon spaced by a distance L1 from the seawater port P2, and similarly a first perforated plate 24 is provided horizontally at a position spaced by a distance L1 from the concentrated seawater port P1. Further, second perforated plates 25 are provided horizontally at positions spaced by a distance L2 from the respective first perforated plates 24. The first perforated plate 24 and the second perforated plate 25 constitute a flow resistor 23.

Figure 11B:
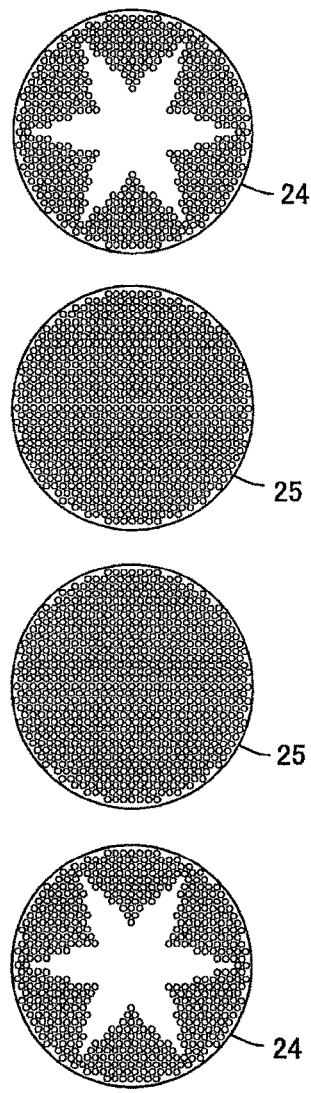
FIG. 11(b) is a plan view showing the respective perforated plates disposed in the energy recovery chamber shown in FIG. 11(a)

FIG. 11(b) is a plan view showing the respective perforated plates disposed in the energy recovery chamber shown in FIG. 11(a), FIG. 11(b) shows the first perforated plate 24 and the second perforated plate 25 at the seawater port side and the second perforated plate 25 and the first perforated plate 24 at the concentrated seawater port side from the top to the bottom. The first perforated plate 24 constituting the flow resistor disposed in the energy recovery chamber shown in FIG. 11(a) comprises a single perforated plate which has a plurality of small holes formed outside a star hexagon having a central hypothetical circle as an incircle and an outer hypothetical circle as a circumcircle and has no hole inside the star hexagon (central side). The first perforated plate 24 has the same structure as that in FIG. 3. The first perforated plate 24 may comprise a porous plate which has a central blockage portion and an outer circumferential portion comprising a mesh material as shown in FIG. 4. Further, the second perforated plate 25 comprises a circular plate having small holes formed at regular intervals over the entire surface thereof. The second perforated plate 25 may comprise a circular plate made of a mesh material.

Figure 12:
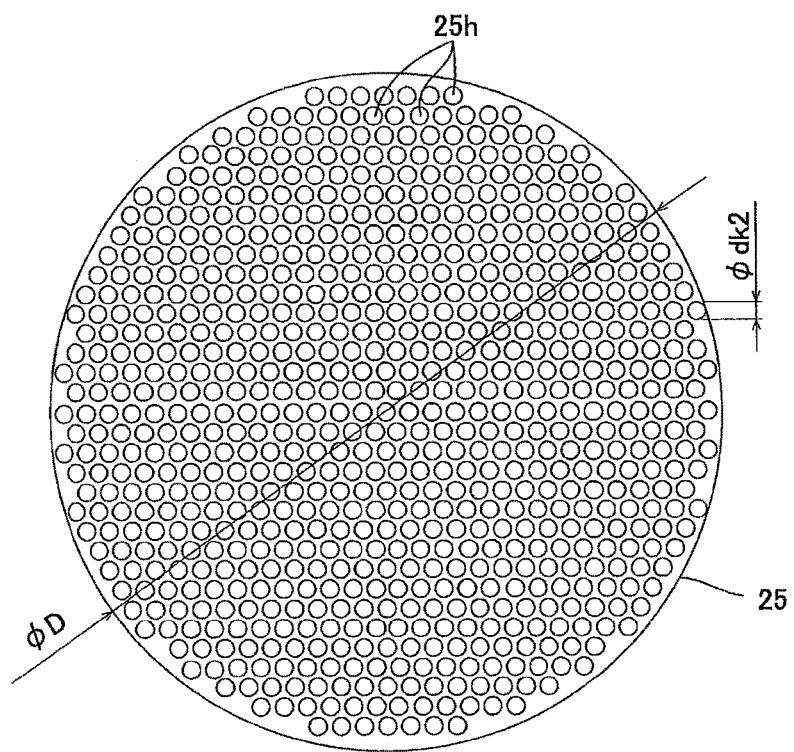
FIG. 12 is an enlarged plan view of the second perforated plate shown in FIG. 11(b)

FIG. 12 is an enlarged plan view of the second perforated plate 25 shown in FIG. 11(b). As shown in FIG. 12, the second perforated plate 25 comprises a circular plate having an outer diameter of $\phi D$ equal to an inner diameter of the chamber, and small holes 25h having a diameter $\phi dk2$ are formed at regular intervals over the entire surface of the circular plate as shown in FIG. 5.

FIGS. 13(a), 13(b) through FIGS. 15(a), 15(b) are views showing the flow distribution in the vicinity of the seawater port when the seawater flows into the chamber in the case where the perforated circular plates 24 whose central portions are blocked in a star hexagonal shape as shown in FIGS. 11(a), 11(b) are disposed as first perforated plates at respective positions spaced by a distance L1 from the seawater port and the concentrated seawater port, and the second perforated plates 25 having uniform small holes over their entire surfaces are disposed at respective positions spaced by a distance L2 from the first perforated plates 24, the first and second perforated plates 24, 25 constituting a flow resistor 23 being disposed horizontally in the chamber. Arrows in figures are as follows: Flow velocity of fluid is shown by a length of arrow and flow direction of fluid is shown by a direction of arrow.

Figure 13A:
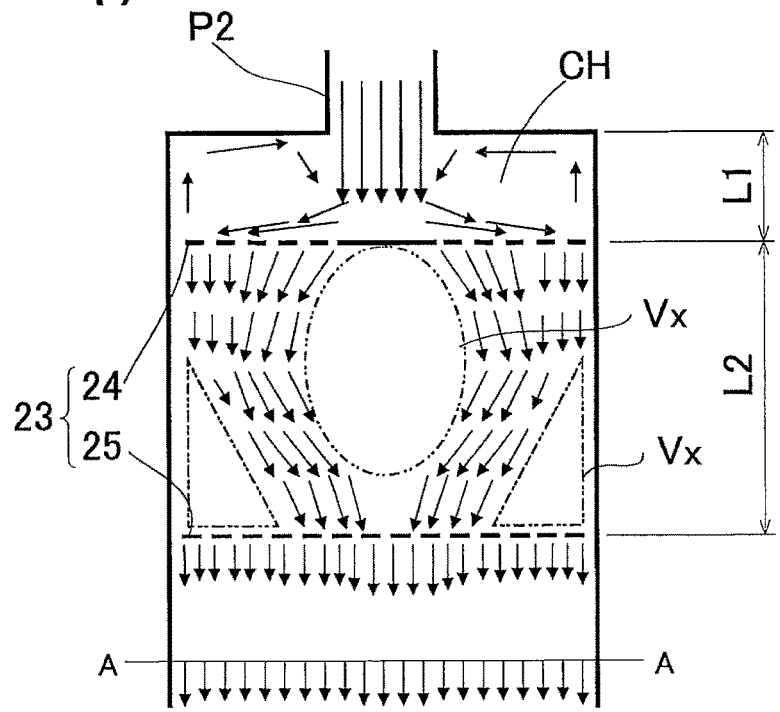
FIGS. 13(a) and 13(b) are views showing the flow distribution of the interior of the chamber in the case where seawater flows into the chamber from the seawater port located in the vicinity of the upper part of the chamber in FIG. 11(a)
Figure 13B:
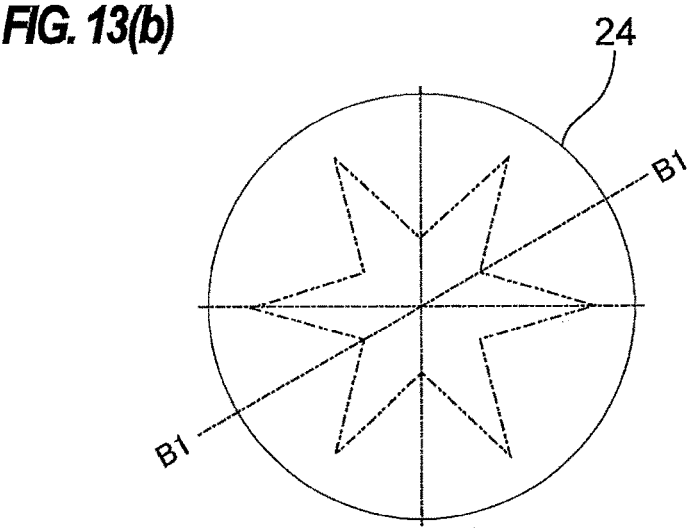

FIGS. 13(a) and 13(b) are views showing the flow distribution in the vicinity of the seawater port of the chamber when the seawater flows into the chamber, in the B1-B1 cross-section passing through points of intersection between the star hexagon and the incircle on the perforated plate. Specifically, FIG. 13(b) is a plan view of the first perforated plate 24 having a structure identical to the structure shown in FIG. 3, and FIG. 13(a) is a view showing the flow distribution in the vicinity of the seawater port of the chamber, in the B1-B1 cross-section of FIG. 13(b). In FIG. 13(b), the small holes 23h outside the star hexagon are omitted from illustration.

Figure 14A:
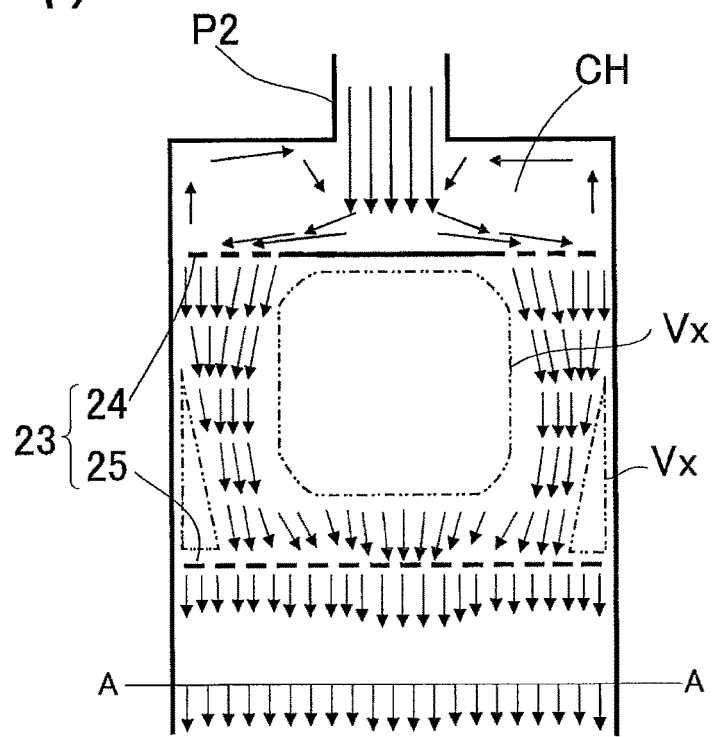
FIGS. 14(a) and 14(b) are views showing the flow distribution in another cross-section of the interior of the chamber in the case where seawater flows into the chamber from the seawater port located in the vicinity of the upper part of the chamber in FIG. 11(a)
Figure 14B:
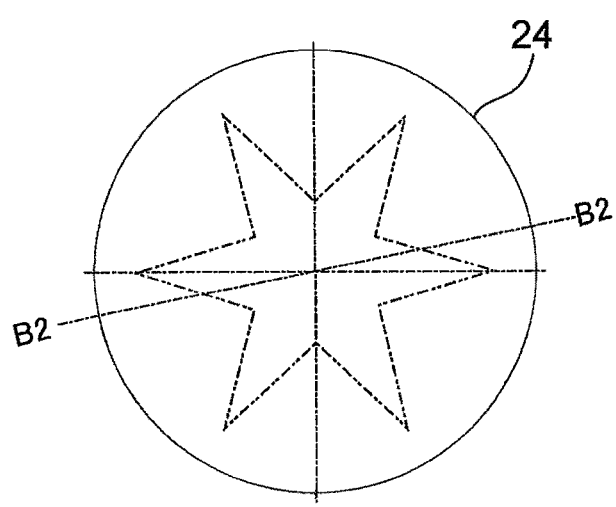

FIGS. 14(a) and 14(b) are views showing the flow distribution in the vicinity of the seawater port of the chamber when the seawater flows into the chamber, in the B2-B2 cross-section passing through the intermediate between a point of intersection between the star hexagon and the incircle and a point of intersection between the star hexagon and the circumcircle on the perforated plate. Specifically, FIG. 14(b) is a plan view of the first perforated plate 24 having a structure identical to the structure shown in FIG. 3, and FIG. 14(a) is a view showing the flow distribution in the vicinity of the seawater port of the chamber, in the B2-B2 cross-section of FIG. 14(b). In FIG. 14(b), the small holes 23h outside the star hexagon are omitted from illustration.

Figure 15A:
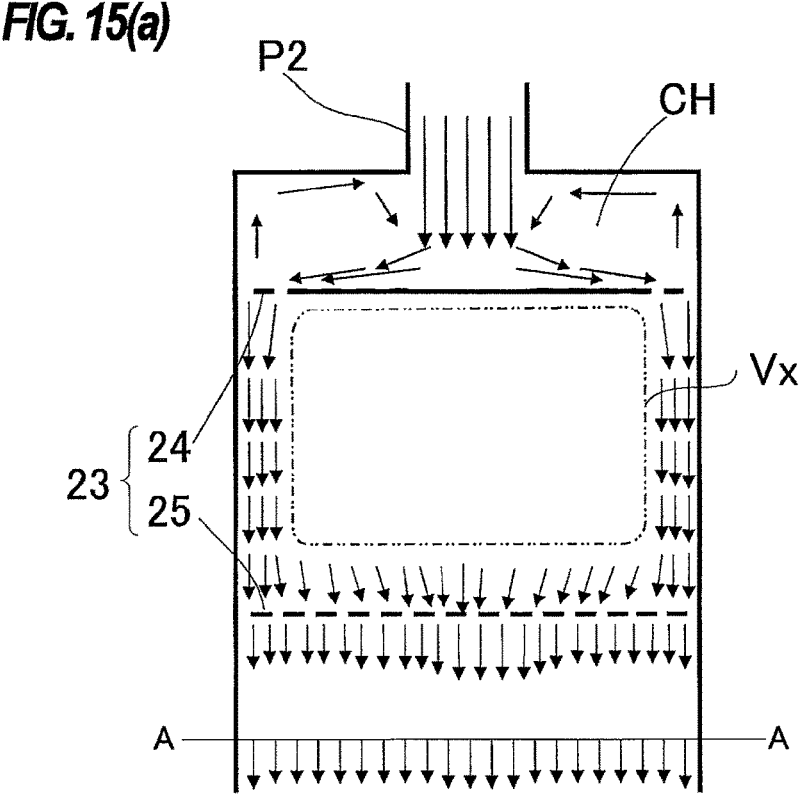
FIGS. 15(a) and 15(b) are views showing the flow distribution in still another cross-section of the interior of the chamber in the case where seawater flows into the chamber from the seawater port located in the vicinity of the upper part of the chamber in FIG. 11(a)
Figure 15B:
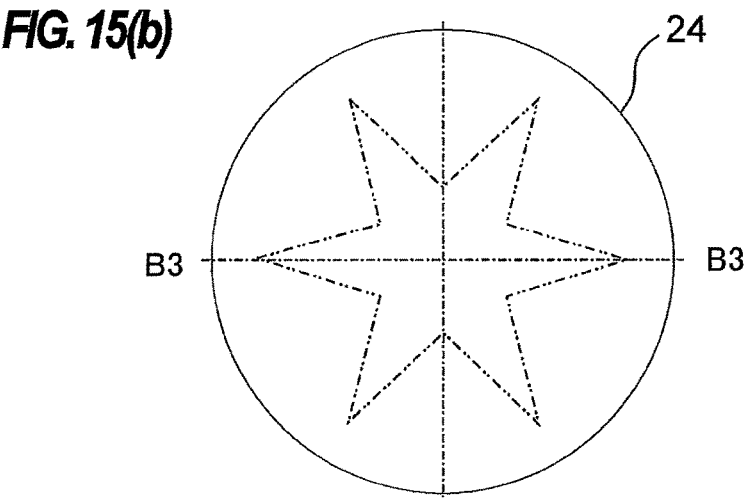

FIGS. 15(a) and 15(b) are views showing the flow distribution in the vicinity of the seawater port of the chamber when the seawater flows into the chamber, in the B3-B3 cross-section passing through points of intersection between the star hexagon and the circumcircle on the perforated plate. Specifically, FIG. 15(b) is a plan view of the first perforated plate 24 having a structure identical to the structure shown in FIG. 3, and FIG. 15(a) is a view showing the flow distribution in the vicinity of the seawater port of the chamber, in the B3-B3 cross-section of FIG. 15(b). In FIG. 15(b), the small holes 23h outside the star hexagon are omitted from illustration.

The state of the flows at the downstream side of the first perforated plate shown in FIGS. 13(a), 13(b) through FIGS. 15(a), 15(b) can be described in substantially the same as the state of the flows described above with reference to FIGS. 8(a), 8(b) through 10(a), 10(b). By providing the first perforated plate 24 and the second perforated plate 25 spaced by a distance L2 from the first perforated plate 24, the flow of fluid that flows into the chamber at a high velocity from the port having a small diameter is dispersed over the entire plane of the chamber section by the first perforated plate 24, and the flow whose velocity distribution has been uniformized by the first perforated plate 24 passes through the second perforated plate 25 having the small holes formed over its entire surface to allow the flow of fluid at the downstream side of the second perforated plate 25 to be regulated into a more uniform flow. Therefore, the flow of fluid becomes closer to the flow whose velocities and directions are the same in the A-A cross-section spaced by a certain distance from the second perforated plate 25 to the chamber center, thus achieving a more uniform flow.

Figure 29:
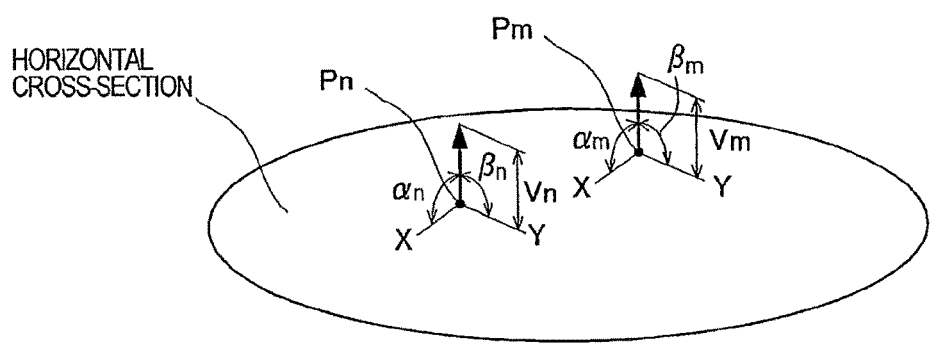
FIG. 29 is a view showing the uniformity of flows at any points Pn, Pm in the horizontal cross-section in the chamber.

The first perforated plate has a function to cause the high-velocity flow of fluid from the seawater port (or the concentrated seawater port) to collides with the central circular blockage portion, thereby reducing the velocity of the flow and dispersing the flow toward the outer circumferential part of the first perforated plate. Then, the first perforated plate disperses the flow of fluid to make the flow at the downstream side of the perforated plate a "uniform" velocity distribution defined in FIG. 29 in the circular cross-section of the chamber by the hole passages whose aperture ratios are gradually increased from the center toward the outer circumference of the first perforated plate. The second perforated plate has a function to further uniformize velocity differences in the velocity distribution which still remain in the flow dispersed by the first perforated plate.

Even if the uniformity of the flows that have passed through the first perforated plate is lost by the inflow velocity, by adding a function to uniformize the velocity distribution by the second perforated plate, the flow resistor can cope with a wider range of inflow velocities. This means that the energy recovery apparatus can cope with a wide range of flow rates to be processed.

Figure 16:
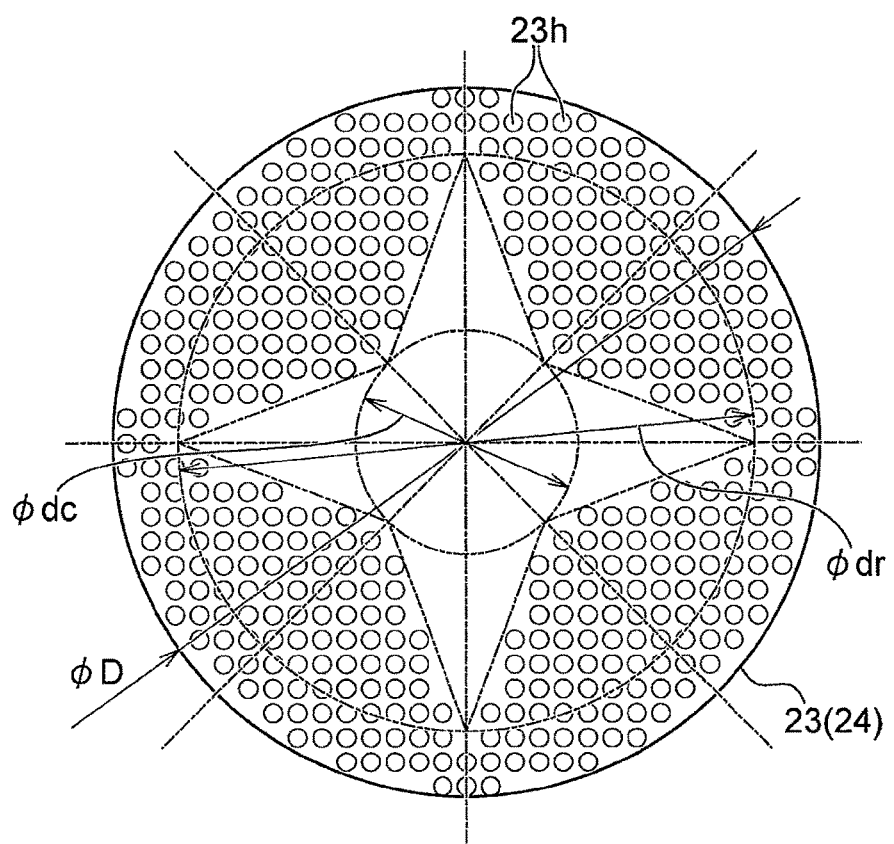
FIG. 16 is a plan view showing a perforated plate of the flow resistor according to another embodiment.

FIG. 16 is a plan view showing another flow resistor. In the case where the flow resistor comprises a single perforated plate shown in FIG. 2, the flow resistor 23 shown in FIG. 16 is used in place of the flow resistor 23 shown in FIG. 3. In the case where the flow resistor comprises two perforated plates shown in FIGS. 11(a) and 11(b), the flow resistor 24 shown in FIG. 16 is used in place of the flow resistor 24 shown in FIGS. 11(a) and 11(b). As shown in FIG. 16, the flow resistor 23 is in the shape of a circular plate having an outer diameter ($\phi$D) equal to the inner diameter of the chamber. The flow resistor 23 comprises a single perforated plate which has a plurality of small holes having a diameter $\phi dk1$ formed outside a star tetragon having a central hypothetical circle ($\phi dc$) as an incircle and an outer hypothetical circle ($\phi dr$) as a circumcircle and has no hole inside the star tetragon (central side). Specifically, the flow resistor 23 comprises a perforated plate which is blocked in its central portion and in part of its outer circumferential portion.

The diameter ($\phi dc$) of the central hypothetical circle on the perforated plate is equal to or slightly greater than the inner diameter $\phi ds$ of the seawater port and the inner diameter $\phi db$ of the concentrated seawater port in FIG. 2, so that the high-velocity flow of fluid flowing in from each of the ports collides with the blockage portion and is slowed down. However, if the blockage portion is excessively larger than each of the ports, the flows of fluid passing through a plurality of small holes 23h provided at an outer circumferential side of the perforated plate are localized in an outer circumferential region, thus making the flow uniformizing action small adversely. Therefore, the diameter of the central hypothetical circle is substantially the same as the inner diameter of each of the ports.

The diameter ($\phi dr$) of the hypothetical circle that circumscribes the star tetragon is smaller than the outer diameter ($\phi$D) of the flow resistor 23.

Figure 17:
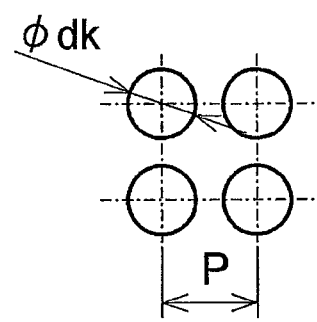
FIG. 17 is an enlarged plan view of holes formed in the perforated plate shown in FIG. 16.

FIG. 17 is an enlarged plan view showing the layout of holes formed in the perforated plate shown in FIG. 16. Holes having a diameter $\phi dk$ are disposed on orthogonal axes and spaced from each other by a distance (pitch) P. The layout of the holes is referred to as a parallel layout, and the aperture ratio APR of the holes is calculated according to the following equation:

$$APR = 78.5 \times dk^2 / P^2 \qquad (3)$$

The central blockage portion of the circular plate is in a shape of a star tetragon and the holes formed in the circular plate are disposed in a parallel layout, and thus the chamber is configured to be 90-degree rotationally symmetric.

The flow resistor comprising the perforated circular plate shown in FIG. 16 is also characterized in that the aperture ratio thereof is gradually increased from the outer diameter of the central hypothetical circle toward the outer diameter of the perforated circular plate. The perforated circular plate shown in FIG. 16 which includes the central blockage portion of the star tetragon is different in the aperture ratio and the gradient of a gradual increase of the aperture ratio from the perforated circular plate shown in FIG. 2 which includes the central blockage portion of the star hexagon.

The flow resistor 23 comprising the perforated plate which is blocked by the star tetragon, has a function to regulate the flow of fluid at the downstream side of the flow resistor 23 so as to be uniformized in the entire chamber by imparting an appropriate flow resistance to the flow of fluid at the upstream side of the flow resistor 23 in the chamber CH. Both the star tetragon (FIG. 16) and the star hexagon (FIG. 2) have an excellent flow uniformizing action, and indicate that the configuration in which the aperture ratio is gradually increased from the outer diameter of the central hypothetical circle toward the outer diameter of the perforated circular plate is effective to uniformize the flow of fluid.

Figure 18:
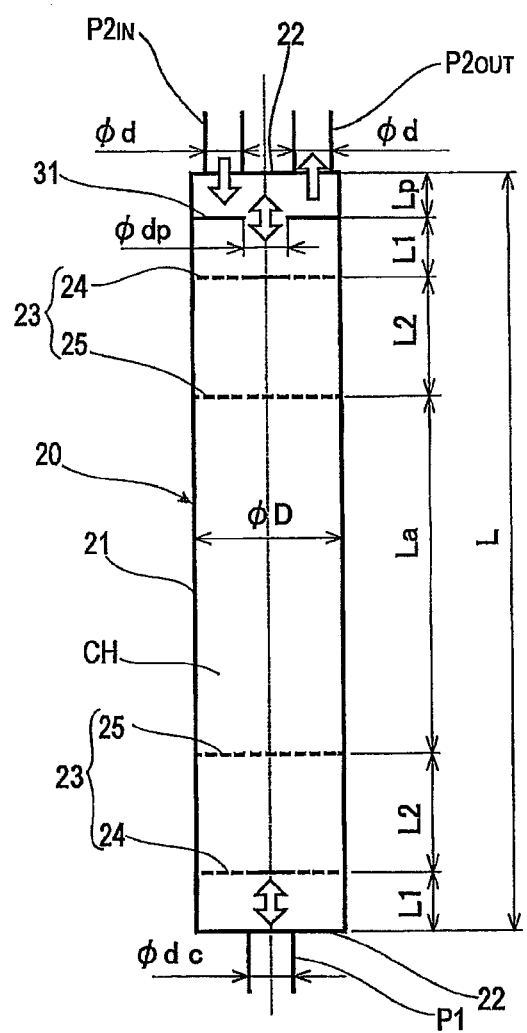
FIG. 18 is a cross-sectional view showing a chamber of the energy recovery apparatus according to still another embodiment of the present invention.

FIG. 18 is a cross-sectional view showing a chamber of the energy recovery apparatus according to still another embodiment of the present invention. The chamber according to the present embodiment has a configuration in which the upper seawater port is divided into two ports comprising a seawater inflow port $P2_{IN}$ and a seawater discharge port $P2_{OUT}$, and the seawater inflow port $P2_{IN}$ and the seawater discharge port $P2_{OUT}$ are arranged at positions spaced radially from the central axis of the chamber. Further, a holed circular plate 31 having a hole at a central part thereof is disposed at a position spaced by a distance Lp from the ports $P2_{IN}$, $P2_{OUT}$. A first perforated plate 24 having a central blockage portion is provided at a position spaced by a distance L1 from the holed circular plate 31, and a second perforated plate 25 having holes formed at regular intervals over the entire surface thereof is provided at a position spaced by a distance L2 from the first perforated plate 24.

Figure 19:
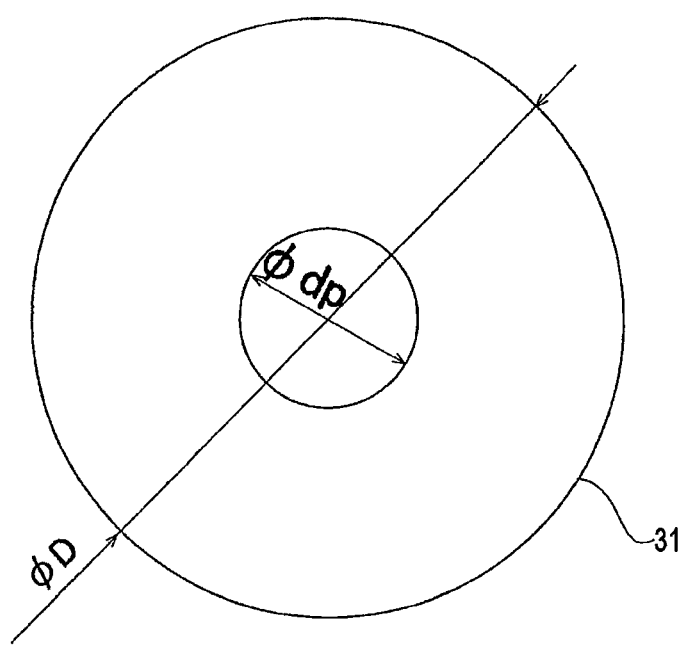
FIG. 19 is a plan view of the holed circular plate.

FIG. 19 is a plan view of the holed circular plate 31. The holed circular plate 31 has an outer diameter equal to the inner diameter ($\phi$D) of the chamber and has a circular hole having a diameter ($\phi$dp) at a central part thereof. By providing the holed circular plate 31, the fluid which has flowed in from the port is regulated so that the fluid does not flow through the outer circumferential portion of the holed circular plate 31, but flows through the hole having a diameter $\phi$dp at the central part of the holed circular plate 31 toward the flow resistor 23. Therefore, even if the port is not disposed at the central part of the chamber, the flow of fluid can be changed once into the flow through the central part of the chamber, and then this flow can be diffused uniformly in an outer circumferential direction and regulated by the flow resistor 23 at the downstream side. Therefore, a uniform flow is formed in the cylindrical chamber.

When the high-velocity seawater flows into the chamber CH from the seawater inflow port $P2_{IN}$ disposed at an eccentric position from the chamber axis, the flow of the seawater collides with the plate portion having no hole at the circumferential portion of the holed circular plate 31 and is then dispersed in the space partitioned by the holed circular plate 31 and located at the seawater port side. Then, the seawater passes through the hole formed at the central portion of the holed circular plate 31 and flows at a high velocity toward the central portion of the first perforated plate 24. Thereafter, the flow of fluid collides with the blockage portion having no hole at the central portion of the first perforated plate 24, and is then dispersed toward the outer circumference of the chamber and slowed down. The flow of fluid at the downstream side of the first perforated plate 24 is the same as the flow described and shown in FIGS. 8(a), (b) to 10(a), (b).

The holed circular plate 31 has the same effect as that of the arrangement in which the seawater inflow port $P2_{IN}$ disposed at an eccentric position from the chamber axis is disposed so as to be aligned with the chamber axis in the chamber.

Figure 20:
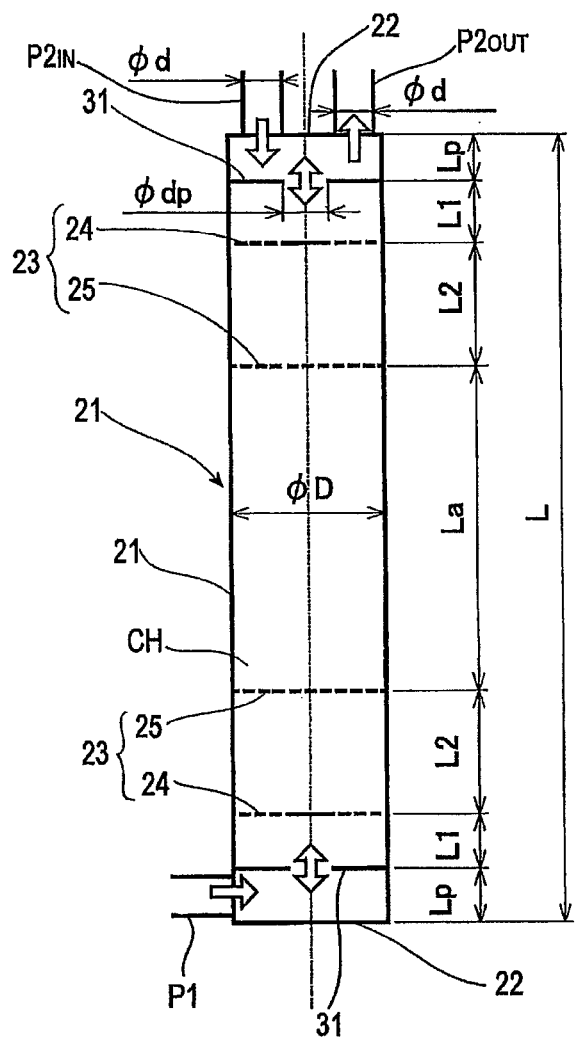
FIG. 20 is a schematic cross-sectional view showing an energy recovery chamber of the energy recovery apparatus according to another embodiment of the present invention.
Figure 21:
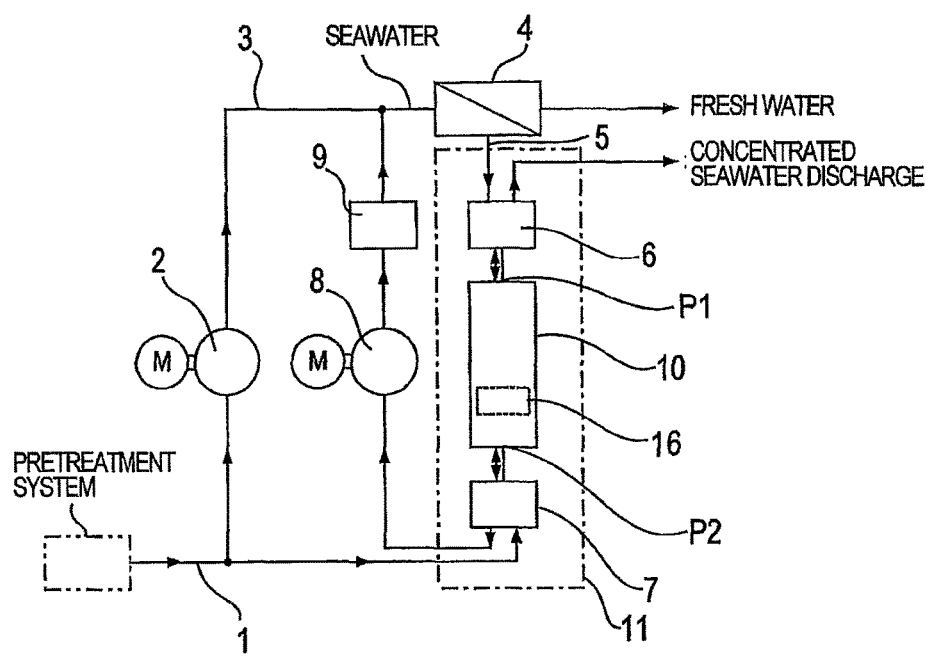
FIG. 21 is a schematic view showing a configuration example of a conventional seawater desalination system.
Figure 22:
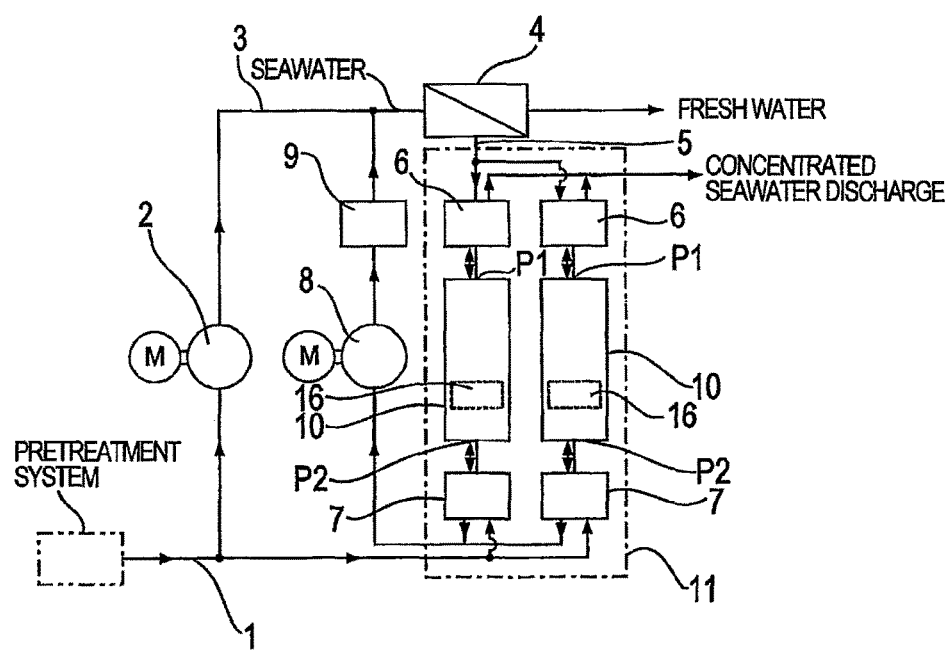
FIG. 22 is a schematic view showing a configuration example of the conventional seawater desalination system comprising the two control valves, the two energy recovery chambers and the two valves which are the components of the energy recovery apparatus shown in FIG. 21.
Figure 23:
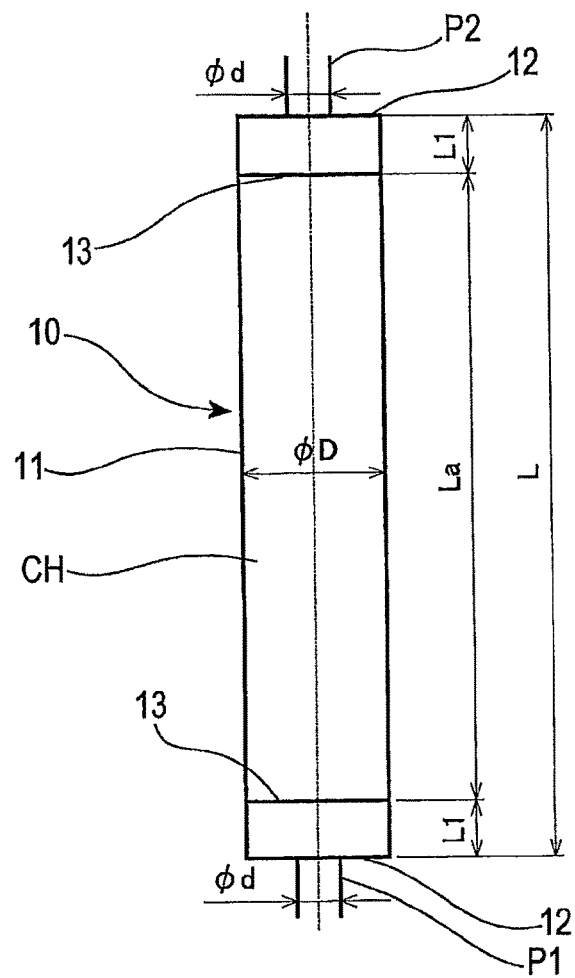
FIG. 23 is a cross-sectional view showing a conventional energy recovery chamber having no piston.
Figure 24:
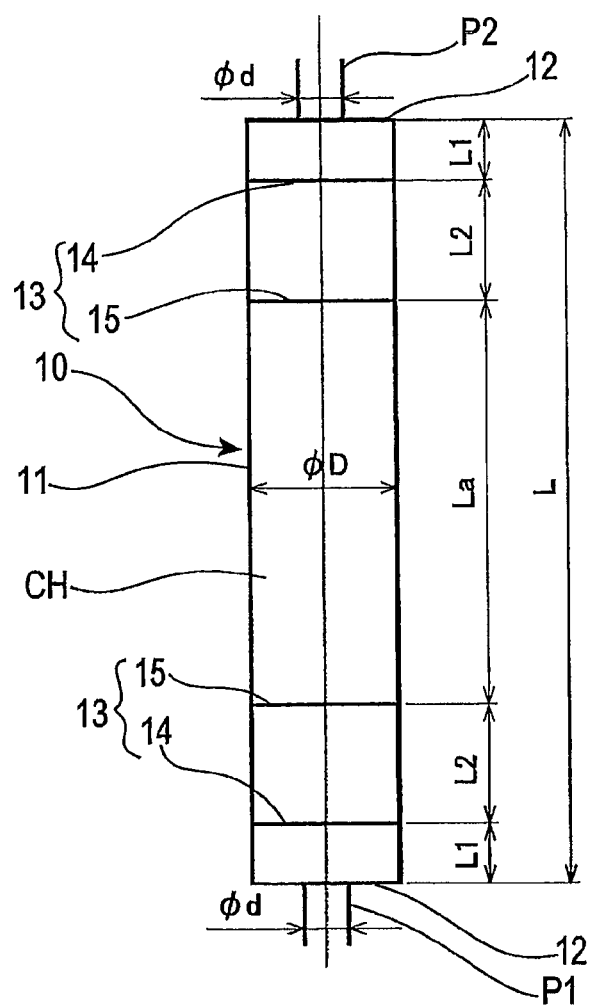
FIG. 24 is a cross-sectional view showing the energy recovery chamber in which two perforated plates spaced by a predetermined distance are disposed near the respective ports as a flow resistor in FIG. 23.

FIG. 20 is a cross-sectional view of the chamber in the energy recovery apparatus according to still another embodiment of the present invention.

The configuration at the seawater port side of the chamber in FIG. 20 is the same as that in the embodiment shown in FIG. 18. However, the chamber of the present embodiment is different in that the concentrated seawater port at the lower part of the chamber is formed at the side surface of the chamber. Specifically, since the concentrated seawater port P1 is formed at the side surface of the chamber, the concentrated seawater is supplied and discharged in a direction perpendicular to the axial direction of the chamber (radial direction of the chamber). Further, the holed circular plate 31 having a hole formed at the central part thereof is provided at a position spaced by a distance Lp from the chamber end surface at the concentrated seawater port side, and the first perforated plate 24 is provided at a position spaced by a distance L1 from the holed circular plate 31. Furthermore, the second perforated plate 25 is provided at a position spaced by a distance L2 from the first perforated plate 24.

The holed circular plate 31 has the same configuration as that shown in FIG. 19, the first perforated plate 24 has the same configuration as that shown in FIG. 3 or FIG. 4, and the second perforated plate 25 has the same configuration as that shown in FIG. 12.

In FIG. 20, the fluid which has flowed in from the concentrated seawater port P1 at the chamber side surface is regulated so that the fluid flows through the hole having a diameter ($\phi$dp) at the central portion of the holed circular plate 31 toward the flow resistor 23. Therefore, even if the port is disposed at the side surface of the chamber, the flow of fluid can be changed once into the flow through the central part of the chamber, and then this flow can be diffused uniformly in an outer circumferential direction and regulated by the flow resistor 23 at the downstream side. Therefore, a uniform flow is formed in the cylindrical chamber.

When the high-velocity concentrated seawater flows into the chamber CH in a direction perpendicular to the chamber axis from the concentrated seawater port P1 disposed at the side surface of the chamber, in the space partitioned by the holed circular plate 31 and located at the concentrated seawater port side, part of the concentrated seawater flows out through the hole formed at the central portion of the holed circular plate 31, and part of the concentrated seawater forms vortices in the space and spreads in the space. Then, the concentrated seawater flows out through the hole formed at the central portion of the holed circular plate 31. Thereafter, the concentrated seawater flows at a high velocity toward the central portion of the first perforated plate 24 from the holed circular plate 31, and the flow of the concentrated seawater collides with the blockage portion having no hole at the central portion of the first perforated plate 24, and is then dispersed toward the outer circumference of the chamber and is slowed down. The flow of fluid at the downstream side after flowing in through the first perforated plate 24 becomes the upside-down flow, which has been described and shown in FIGS. 8(*a*), (*b*) to 10(*a*), (*b*).

As described above, the uniformizing action of the flow by the flow resistor at the inflow side varies also depending on the arrangement of the flow resistor 23 and the port at the discharge side. By providing the holed circular plate 31 having a hole at the central part thereof, the inflow position of the fluid to the flow resistor 23 becomes a center of the chamber, regardless of the arrangement of the port. As in the embodiments shown in FIG. 18 and FIG. 20, even if the actual seawater port and the concentrated seawater port are not located centrally, the hole formed at the central part of the holed circular plate 31 disposed between each port and the flow resistor 23 can be considered as a hypothetical seawater port or concentrated seawater port in the chamber. Thus, the operation and the effect equivalent to the invention according to the embodiments shown in FIG. 2 and FIGS. 11(*a*), (*b*) can be obtained.

In this manner, in order to form a uniform flow in the chamber space (the portion of La in FIGS. 2, 11(*a*), 18 and 20) in which the seawater and the concentrated seawater are pushed and pulled, the present invention has a configuration which has the inflow and discharge port (or hole) at the chamber center position, the flow resistor, the chamber space in which the seawater and the concentrated seawater are pushed and pulled, the flow resistor, and the inflow and discharge port (or hole) at the chamber center position. Thus, even if the fluid flows in the opposite direction, the same configuration is formed and the same sequence of flow is formed. In this manner, in the inflow and discharge of the fluid, the flow resistance arranged in the chamber has symmetry.

The flow resistors arranged in the chamber between the ports are rotationally symmetric about a chamber central axis, and the flow resistance of inflow and discharge of fluid in the radial direction of the chamber is arranged to be rotationally symmetric. As in the embodiment in FIG. 18, in the case where one of the ports is not located at the center of the chamber, the internal structure of the chamber between the hole at the central portion of the holed circular plate 31 and the central port is rotationally symmetric about the chamber central axis. As in the embodiment shown in FIG. 20, in the case where both ports are not located at the chamber center, the internal structure of the chamber between the holes at the central portions of both the holed circular plates 31 is rotationally symmetric about the chamber central axis.

When the discharge of the concentrated seawater in the case where the holed circular plate 31 is not provided at the concentrated seawater side in FIG. 20 is considered, the flow of the concentrated seawater is offset in a radial direction because the concentrated seawater is easily discharged from the flow resistor 23 at the concentrated seawater port side to the port P1 side at the left side located downstream of the flow resistor 23. As a result, considering the seawater inflow, the action by the flow resistor 23 at the seawater side is affected by non-uniformity of the flow resistance downstream of the flow resistor 23, and thus the uniformizing action is lost. This is because in the case where the holed circular plate 31 in the embodiment of FIG. 20 is not provided, the rotational symmetry about the chamber central axis in the arrangement between the ports is lost and the characteristic of the structural symmetry of the present invention is lost. Thus, according to the present invention, the action of the flow resistors arranged in the chamber between the ports (holes) is made to be rotationally symmetric about the chamber central axis, and thus the flow resistance in a radial direction of the chamber becomes rotationally symmetric, thus forming a uniform flow in the pushing and pulling space between the flow resistors.

Although certain preferred embodiments of the present invention have been shown and described in detail, it should be understood that various changes and modifications may be made without departing from the scope of the appended claims.

INDUSTRIAL APPLICABILITY

The present invention is applicable to a seawater desalination system for desalinating seawater by removing salinity from the seawater and an energy recovery apparatus which is preferably used in the seawater desalination system.

REFERENCE SIGNS LIST

1 seawater supply line
2 high-pressure pump
3 discharge line
4 reverse-osmosis membrane-separation apparatus
5 concentrated seawater line
6 control valve
7, 9 valve
8 booster pump
10, 20 energy recovery chamber
11 energy recovery apparatus
12, 22 end plates
13, 23 flow resistor
14, 24 first perforated plate
15, 25 second perforated plate
16 piston
17 concentrated seawater discharge line
21 chamber body
23*h* hole
30 circular plate
31 holed circular plate
CH chamber
P1 concentrated seawater pert
P2 seawater port
$P2_{IN}$ seawater inflow port
$P2_{OUT}$ seawater discharge port

The invention claimed is:

1. An energy recovery apparatus for converting pressure energy of concentrated seawater discharged from a reverse-osmosis membrane-separation apparatus to pressure energy of seawater in a seawater desalination system for producing fresh water from the seawater by supplying the seawater pressurized by a pump to the reverse-osmosis membrane-separation apparatus to separate the seawater into fresh water and concentrated seawater, the energy recovery apparatus comprising:

a cylindrical chamber having a space for containing concentrated seawater and seawater therein, the chamber being installed such that a longitudinal direction of the chamber is placed in a vertical direction;

a concentrated seawater port provided at a lower part of the chamber for supplying and discharging the concentrated seawater;

a seawater port provided at an upper part of the chamber for supplying and discharging the seawater;

a flow resistor provided at a concentrated seawater port side in the chamber; and a flow resistor provided at a seawater port side in the chamber;

wherein each of the flow resistor provided at the concentrated seawater port side and the seawater port side comprises at least one performed circular plate; and wherein each perforated circular plate has a plurality of holes formed in an outer circumferential area outside a hypothetical circle which is concentric with the perforated circular plate and has a predetermined diameter, the holes being formed so that an aperture ratio is varied in a circumferential direction of the perforated circular plate in the outer circumferential area outside the hypothetical circle having the predetermined diameter.

2. The energy recovery apparatus according to claim 1, wherein an area of the perforated circular plate that is free of the holes is an area of a polygon which has a circle having a predetermined diameter as an incircle and a circle having a diameter equal to or smaller than the outer diameter of the perforated circular plate and greater than the diameter of the hypothetical circle as a circumcircle.

3. The energy recovery apparatus according to claim 1, wherein the flow resistor is rotationally symmetric about a central axis of the cylindrical chamber.

4. The energy recovery apparatus according to claim 1, wherein the perforated circular plate serves as a first perforated plate, and a second perforated plate is provided to be spaced by a predetermined distance from the first perforated plate.

5. The energy recovery apparatus according to claim 1, further comprising a doughnut-shaped circular plate having an opening at a center thereof provided between one of the concentrated seawater port and the seawater port or both of the concentrated seawater port and the seawater port, and the flow resistor.

6. A seawater desalination system for producing fresh water from seawater by supplying the seawater pressurized by a pump to a reverse-osmosis membrane-separation apparatus to separate the seawater into fresh water and concentrated seawater, the seawater desalination system comprising:

an energy recovery apparatus according to claim 1 for converting pressure energy of the concentrated seawater discharged from the reverse-osmosis membrane-separation apparatus to pressure energy of the seawater.

* * * * *